(12) United States Patent
Jayakumar et al.

(10) Patent No.: US 10,387,072 B2
(45) Date of Patent: Aug. 20, 2019

(54) SYSTEMS AND METHOD FOR DYNAMIC ADDRESS BASED MIRRORING

(71) Applicant: Intel Corporation, Santa Clara, CA (US)

(72) Inventors: Sarathy Jayakumar, Portland, OR (US); Mohan J. Kumar, Aloha, OR (US); Ashok Raj, Portland, OR (US); Hemalatha Gurumoorthy, Hillsboro, OR (US); Ronald N. Story, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 3 days.

(21) Appl. No.: 15/393,935

(22) Filed: Dec. 29, 2016

(65) Prior Publication Data

US 2018/0188966 A1   Jul. 5, 2018

(51) Int. Cl.
 *G06F 3/06* (2006.01)
 *G06F 11/16* (2006.01)
 *G06F 11/20* (2006.01)

(52) U.S. Cl.
 CPC ............ *G06F 3/065* (2013.01); *G06F 3/0619* (2013.01); *G06F 3/0673* (2013.01); *G06F 11/1666* (2013.01); *G06F 11/2056* (2013.01); *G06F 11/2094* (2013.01)

(58) Field of Classification Search
 CPC ....... G06F 3/065; G06F 3/0619; G06F 3/0673

USPC ....................................................... 711/162
See application file for complete search history.

(56) References Cited

U.S. PATENT DOCUMENTS

| | | | |
|---|---|---|---|
| 5,974,506 A | 10/1999 | Sicola et al. | |
| 7,340,555 B2 * | 3/2008 | Ashmore | G06F 3/0611 710/305 |
| 2007/0143553 A1 * | 6/2007 | LaBerge | G06F 12/0653 711/154 |
| 2009/0216985 A1 * | 8/2009 | O'Connor | G06F 11/1076 711/170 |
| 2011/0154104 A1 | 6/2011 | Swanson et al. | |
| 2014/0115182 A1 * | 4/2014 | Sabaa | H04L 67/1097 709/232 |

OTHER PUBLICATIONS

Partial European Search Report dated Apr. 23, 2018, for European Patent Application No. 17204240.0, 14 pages.
Extended European Search Report dated Jul. 27, 2018, for European Patent Application No. 17204240.0, 13 pages.

* cited by examiner

*Primary Examiner* — Pierre Miche Bataille
(74) *Attorney, Agent, or Firm* — Alliance IP, LLC

(57) ABSTRACT

A systems and methods for dynamic address based minoring are disclosed. A system may include a processor, comprising a mirror address range register to store data indicating a location and a size of a first portion of a system memory to be mirrored. The processor may further include a memory controller coupled to the mirror address range register and including circuitry to cause a second portion of the system memory to mirror the first portion of the system memory.

20 Claims, 14 Drawing Sheets

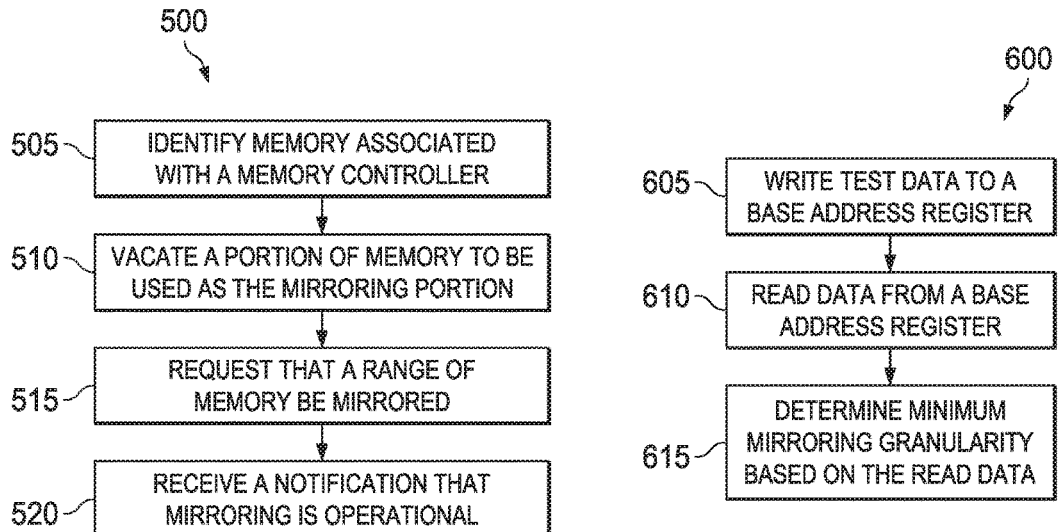
FIG. 5
FIG. 6
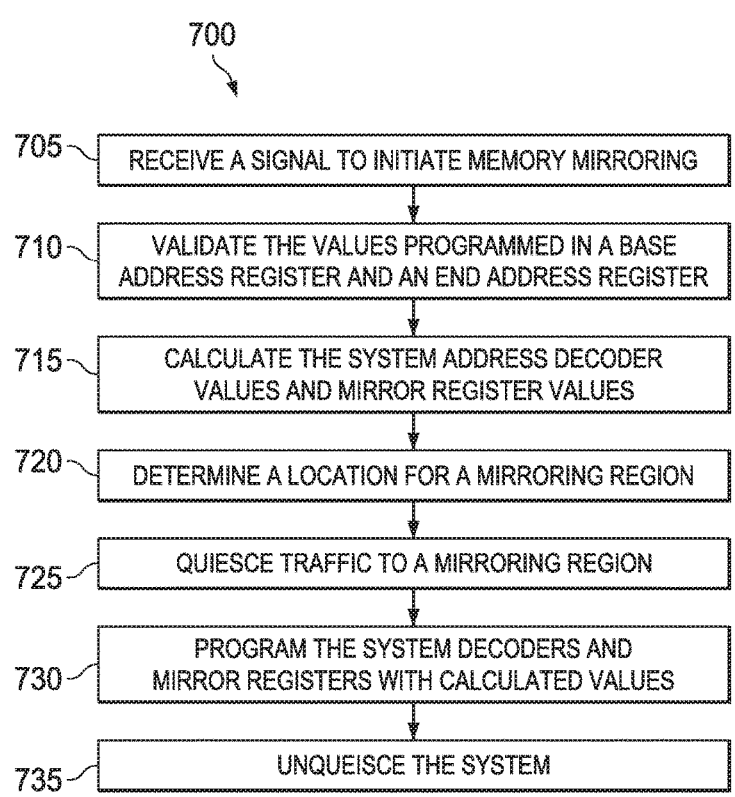
FIG. 7

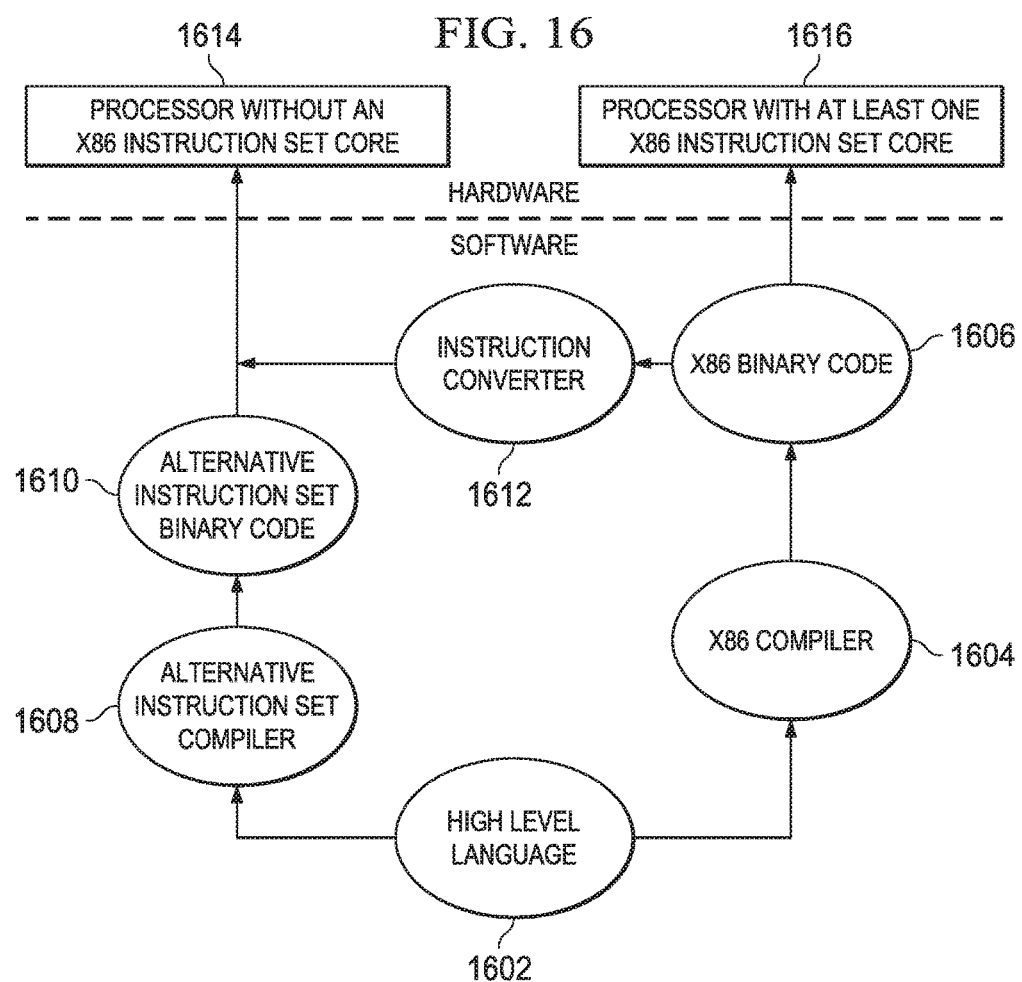

US 10,387,072 B2

SYSTEMS AND METHOD FOR DYNAMIC ADDRESS BASED MIRRORING

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. Processors may include multiple subsystems or functional blocks. For example, a processor may include one or more memory controllers which operate as interfaces to memories in a system. Memory controllers may operate to mirror data in such memories to increase system tolerance to memory failures.

DESCRIPTION OF THE FIGURES

Various embodiments of the present disclosure are illustrated by way of example and not limitation in the Figures of the accompanying drawings, in which like references indicate similar elements, and in which:

FIG. 5 is a flowchart of a method of initiating dynamic address based mirroring, according to some embodiments of the present disclosure;

FIG. 6 is a flowchart of a method of determining granularity of memory mirroring register, according to some embodiments of the present disclosure;

FIG. 7 is a flowchart of a method of implementing dynamic address based mirroring, according to some embodiments of the present disclosure;

FIG. 16 is a block diagram illustrating the use of a compiler and a software instruction converter to convert binary instructions in a source instruction set to binary instructions in a target instruction set, according to some embodiments of the present disclosure.

DETAILED DESCRIPTION

Figure 1A:
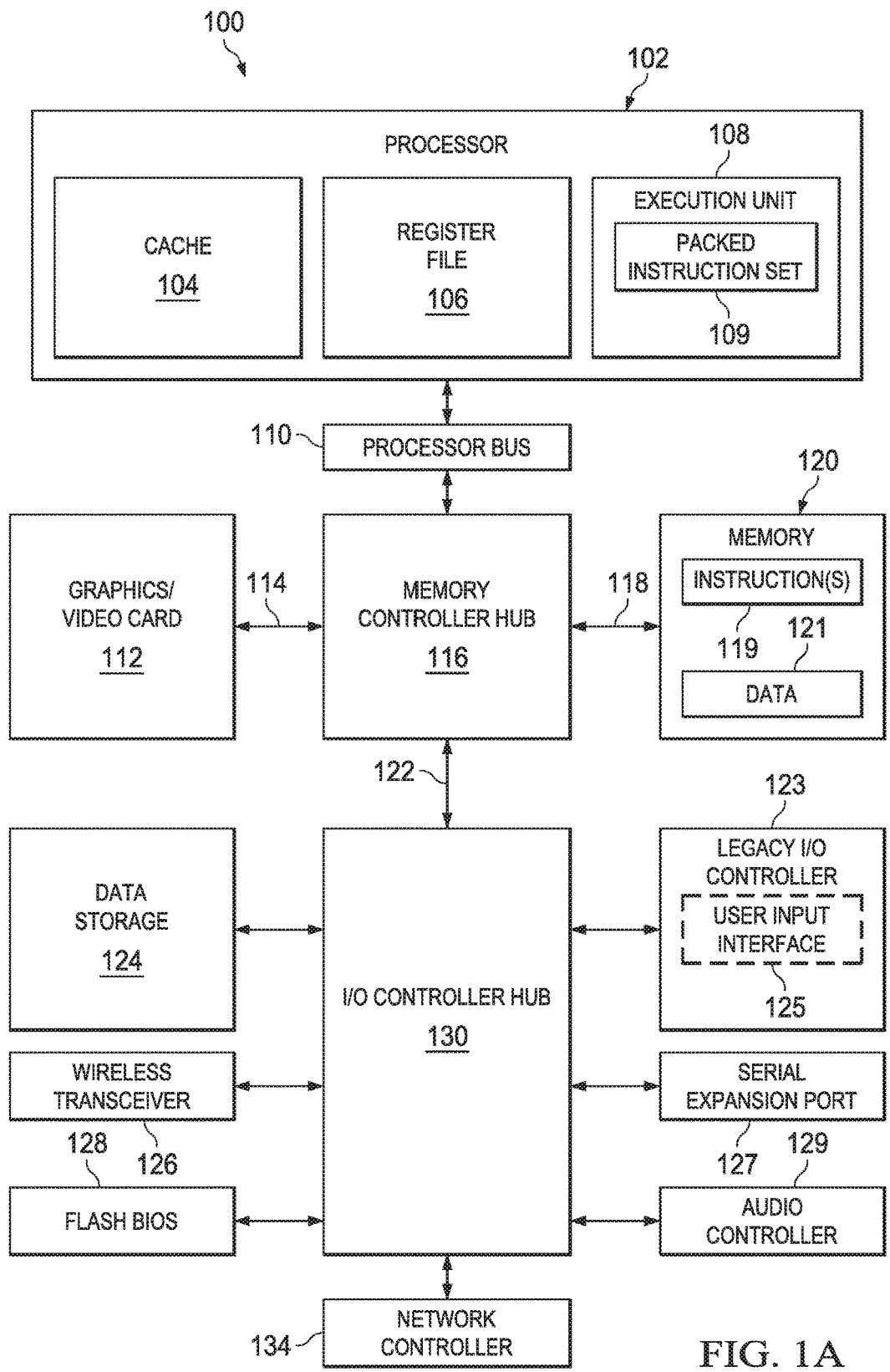
FIG. 1A is a block diagram of an exemplary computer system formed with a processor that may include execution units to execute an instruction, in accordance with embodiments of the present disclosure.

The following description describes circuitry and processing logic for implementing dynamic address based mirroring. Such a processing apparatus may include an out-of-order processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that other embodiments may be practiced without such specific details. Additionally, some well-known structures, circuits, and the like have not been shown in detail to avoid unnecessarily obscuring the example embodiments of the present disclosure included herein.

References in the specification to "one embodiment," "an embodiment," "an example embodiment," etc., indicate that the embodiment described may include a particular feature, structure, or characteristic. However, not all embodiments of the present disclosure necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to affect such a feature, structure, or characteristic in connection with other embodiments of the disclosure, whether or not such a connection is explicitly described.

Although some example embodiments are described with reference to a processor, other embodiments may be applicable to other types of integrated circuits and logic devices. Similar techniques and teachings of various embodiments of the present disclosure may be applied to other types of circuits or semiconductor devices that may benefit from higher pipeline throughput and improved performance. The teachings of the example embodiments of the present disclosure may be applicable to any processor or machine that performs data manipulations. However, other embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the examples below describe instruction handling and distribution in the context of execution units and logic circuits, other embodiments of the present disclosure may be accomplished by way of data or instructions stored on a machine-readable, tangible medium, which when performed by a machine cause the machine to perform functions consistent with at least one embodiment of the disclosure. In some embodiments, functions associated with embodiments of the present disclosure may be embodied in machine-executable instructions. The instructions may be used to cause a general-purpose or special-purpose processor that may be programmed with the instructions to perform the operations of the present disclosure. Some embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, operations of some embodiments of the present disclosure might be performed by specific hardware components that contain fixed-function logic for performing the operations, or by any combination of programmed computer components and fixed-function hardware components. Throughout this disclosure, unless explicitly stated otherwise, a compound form of a reference numeral refers to the element generically or collectively. Thus, for example, widget 101A or 101-1 refers to an instance of a widget class, which may be referred to collectively as widgets 101 and any one of which may be referred to generically as widget 101.

Instructions used to program logic to perform some embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MIIVIX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MIIVIX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with some embodiments of the present disclosure. System 100 may include a component, such as a processor 102, to employ execution units including logic to perform algorithms for processing data, in accordance with the present disclosure, such as in the example embodiments described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments of the present disclosure are not limited to computer systems. Some embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Some embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions 119 and/or data 121 represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for storage of instructions 119 and data 121 and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller 129, firmware hub (flash BIOS) 128, wireless transceiver 126, data storage 124, legacy I/O controller 123 containing user input interface 125 (which may include a keyboard interface), a serial expansion port 127 such as Universal Serial Bus (USB), and a network controller 134. Data storage device 124 may comprise a hard disk drive, a floppy disk drive, a CD-ROM device, a flash memory device, or other mass storage device.

In another example system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
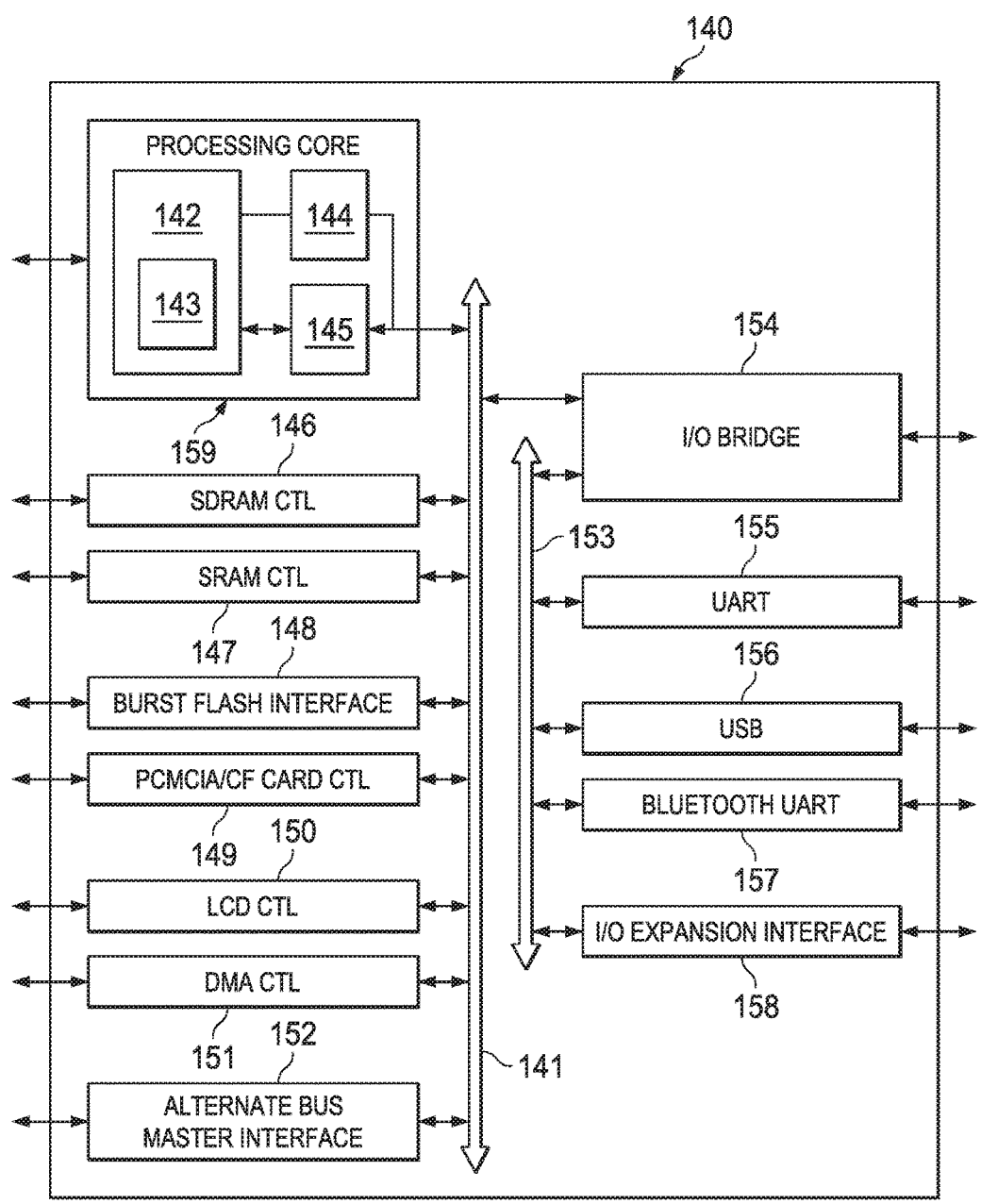
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
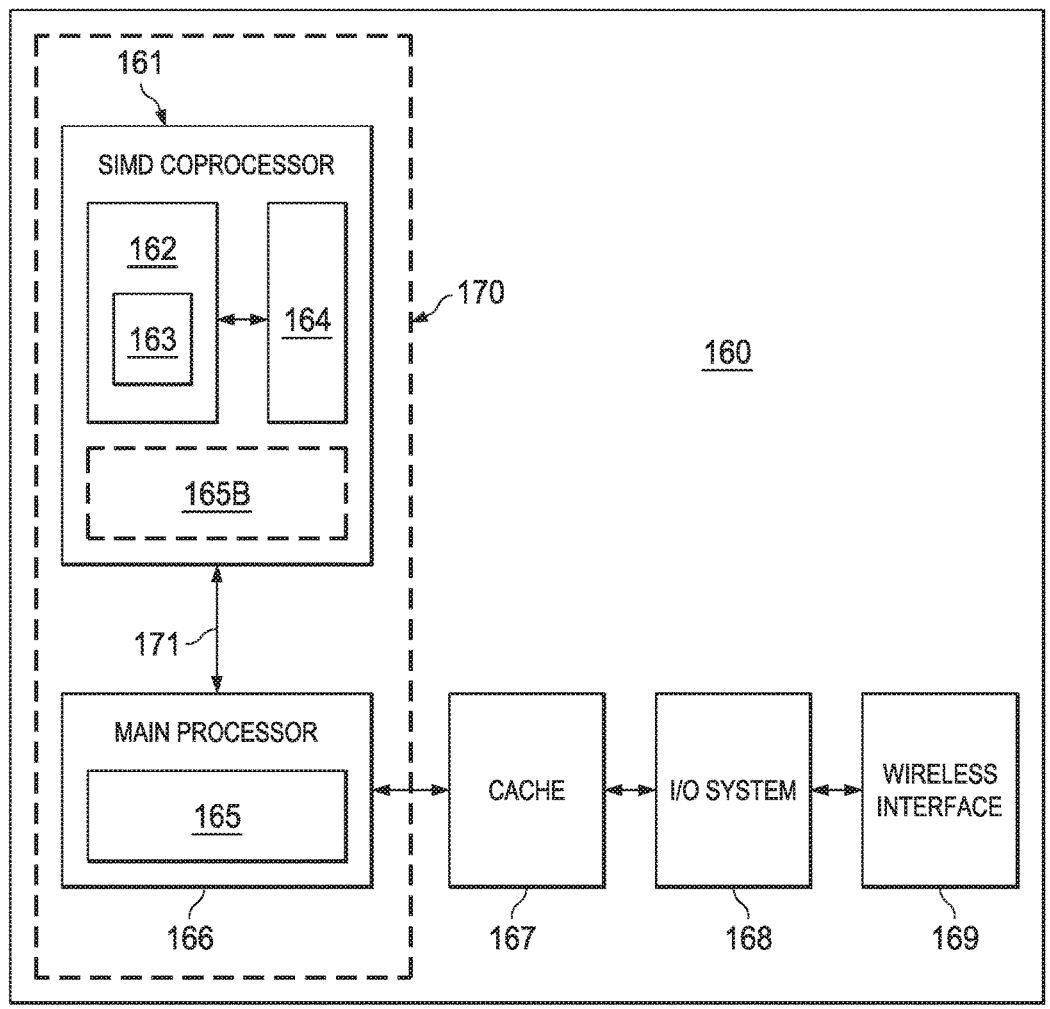
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165 to recognize instructions of instruction set 163 including instructions in accordance with one embodiment for execution by execution unit 162. In other embodiments, SIMD coprocessor 161 also comprises at least part of decoder 165 (shown as 165B) to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 171. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
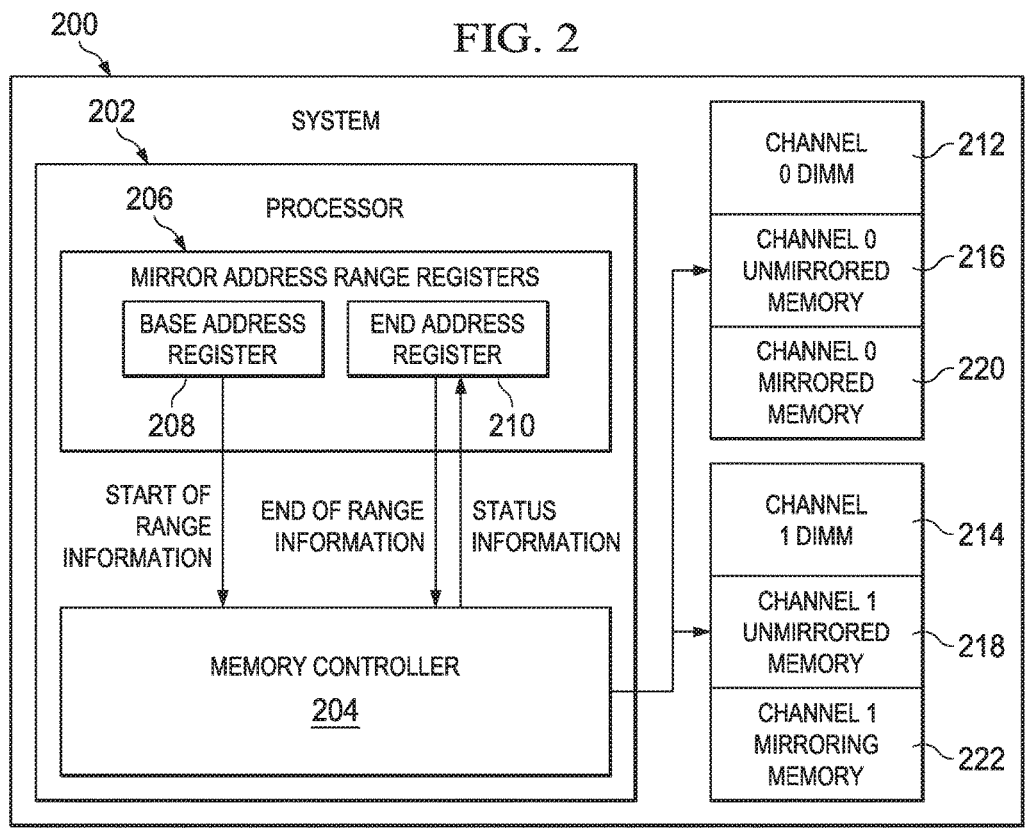
FIG. 2 illustrates a system 200 that implements dynamic addressed based mirroring, according to some embodiments of the present disclosure.

FIG. 2 illustrates a system 200 that implements dynamic addressed based mirroring, according to some embodiments of the present disclosure. System 200 may include processor 202. In some embodiments, processor 202 may include features that are similar to processor 102, described above with reference to FIGS. 1A-1C. Processor 202 may include memory controller 204. Memory controller 204 may include circuitry or logic to implement memory mirroring. Memory mirroring may allow a system to tolerate and survive uncorrectable errors by causing some or all of the contents of a memory to be duplicated in multiple locations in the memory with memory mirroring. If a portion of the memory storing one copy of the data experiences a failure, a system may continue operating by referring to the backup or duplicate copy. Memory mirroring may therefore increase system uptime by allowing a system to continue operating despite a memory failure.

Several implementations of memory mirroring are possible. For example, a system may use full-system mirroring. In full-system mirroring, the available memory in a system may be divided into two portions, and each portion may store one copy of memory data. In some implementations of full-system memory mirroring, the two portions of memory space are located within two separate physical memory components. A memory controller may include multiple channels. Each channel may interface to an associated memory component such as a dual in-line memory module (DIMM), a single in-line memory module (SIMM), or any other suitable memory component. In full-system memory mirroring, one copy of the memory data may be located in a memory component (such as a first DIMM) associated with a first channel of a memory controller. A second copy of the memory data may be located in a second memory component (such as a second DIMM) associated with a second channel of the memory controller. In the event that one memory component suffers a failure, a system may still function by using the copy of the memory data in the other memory component. Full memory mirroring may increase uptime substantially because every portion of memory is duplicated, and consequently a failure in any part of memory would not cause the system to fail. However, in a system implementing full-system memory mirroring, only half of the system memory is available to the operating system or virtual machine manager, since the other half is used to provide redundancy. Therefore, full-system memory mirroring causes a substantial reduction in the capacity of memory available to an operating system or virtual machine manager, which may be cost-prohibitive.

Another example memory mirroring implementation is fixed address based mirroring (which may also be referred to as "address range mirroring" or "partial mirroring"). In a system implementing fixed address based mirroring, a small range of the total available memory may be mirrored, rather than all available system memory. Fixed address based mirroring may provide a system with a highly reliable memory range to store important workloads (such as the kernel), without having to sacrifice half of the installed memory capacity. In some existing or conventional fixed address based mirroring, the OS cannot arbitrarily specify any range to be mirrored. Rather, fixed address based mirroring may require that the operating system or virtual machine manager use a static predefined mirror region for mirroring. An operating system or virtual machine manager may be able identify the designated region through the basic input/output system ("BIOS"). Enabling full-system mirroring or conventional fixed address based mirroring may require a system reboot before the new region is mirrored, which may result in customer losses of system uptime. Accordingly, many customers might not utilize fixed address based mirroring even when such features are available.

Dynamic addressed based mirroring, in accordance with at least some embodiments of the present disclosure, may provide an adaptable memory mirroring system that maximizes the ability of the operating system or virtual machine manager to use memory mirroring while minimizing system down time. For example, dynamic address based mirroring may allow an operating system or virtual machine manager to dynamically select an arbitrary range of memory to be mirrored. Additionally, dynamic address based memory mirroring may allow a system to implement memory mirroring without rebooting. Various embodiments of dynamic address based memory mirroring may include hardware, circuitry, or logic to implement the memory mirroring function and to interface between an operating system or virtual machine manager and a memory controller.

Processor 202 may include circuitry or logic to allow an operating system or virtual machine manager to request a range of memory to be mirrored. For example, processor 202 may include one or more mirror address range registers 206. An operating system or virtual machine manager may initiate or terminate dynamic address based mirroring by writing information to mirror address range registers 206. An operating system or virtual machine may receive or otherwise obtain information regarding a status of dynamic address based mirroring by reading information from mirror address range registers 206.

Mirror address range registers 206 may be architectural registers. In some embodiments, the existence of mirror address range registers 206 may be exposed to an operating system or virtual machine manager through one or more corresponding CPUID feature flags. In some embodiments, the existence of mirror address range registers 206 may be exposed to an operating system or virtual machine manager via an Advanced Configuration and Power Interface (ACPI) Fixed Functional Hardware mechanism. In either case, an operating system or virtual machine manager may be able to dynamically discover the presence of these mirror address range registers 206 and an association between the memory controller 204 and mirror address range registers 206.

In some embodiments, mirror address range registers 206 may include one or more registers to store information related to dynamic address based mirroring. For example, mirror address range registers 206 may include circuitry or logic, such as base address register 208, to store bits of data that represent a base address of a range of memory to be mirrored. Additionally, mirror address range registers 206 may include circuitry or logic, such as end address register 210, to store bits of data that represent an end of a range of memory addresses to be mirrored. Mirror address range registers 206 may also store information indicating the status of a range of mirrored memory addresses. In some embodiments in which a processor includes multiple memory controllers, the processor may include a respective instance of mirror address range registers 206 for each memory controller capable of implementing dynamic address based mirroring.

In some embodiments, an operating system or virtual machine manager may request that a portion of memory be mirrored. For example, in response to an end-user request, or in response to a coded function in an executed piece of software, an operating system or virtual machine manager may specify a location and size of a portion of the available system memory to be mirrored. To implement memory mirroring, an operating system or virtual machine manager may write information to mirror address range registers 206 to cause memory mirroring to begin. For example, an operating system or virtual machine manager may write data representing a base address of a region to be mirrored and a size of a region to be mirrored to mirror address range registers 206.

In response to data being written to mirror address range registers 206, memory controller 204 may cause a portion of the memory associated with memory controller 204 to be mirrored. For example, in the embodiment illustrated in FIG. 2, memory controller 204 is a two channel memory controller and is coupled to channel 0 DIMM 212 and channel 1 DIMM 214. Channel 0 DIMM 212 and channel 1 DIMM 214 may be any suitable memory component, such a physical DDR DIMM. For example, in one embodiment, channel 0 DIMM 212 and channel 1 DIMM 214 may be 16 gigabyte DDR DIMMS. In some embodiments, a mirrored region may be located in the same memory component as a mirroring region. For example, a mirrored region and a mirroring region may be located in the same DIMM.

In response to data being written to mirror address range registers 206, memory controller 204 may cause a portion of the memory associated with channel 0 DIMM 212 to be mirrored by a similarly sized portion of memory in channel 1 DIMM 214. For example, if an operating system or virtual memory machine requests mirroring of a portion of memory, memory controller 204 may subdivide the memory in channel 0 DIMM 212 into channel 0 unmirrored memory 216 and channel 0 mirrored memory 220. For example, an operating system may request a block of 4 GB of mirrored memory. In such an example, channel 0 mirrored memory would be 4 GB in size. Channel 0 unmirrored memory 216 may include the remaining memory available in channel 0 DIMM 212. For example, if channel 0 DIMM 212 has a capacity of 16 GB, and channel 0 mirrored memory is 4 GB in size, then channel 0 unmirrored memory 216 may include the remaining 12 GB of available memory in channel 0 DIMM 212.

Memory controller 204 may further cause a portion of channel 1 DIMM 214 to duplicate the contents of channel 0 mirrored memory 220. For example, memory controller 204 may subdivide channel 1 DIMM 214 into channel 1 unmirrored memory 218 and channel 1 mirroring memory 222. Channel 1 mirroring memory 222 may be approximately the same size as channel 0 mirrored memory 220. In some embodiments, channel 1 mirroring memory 222 may be the same size as channel 0 mirrored memory 220. Accordingly, in the example in which channel 0 mirrored memory 220 is 4 BG, channel 1 mirroring memory 222 may also be 4 GB. Channel 1 unmirrored memory 218 may include the remaining portion of channel 1 DIMM 214. For example, if channel 1 DIMM 214 has a capacity of 16 GB, and channel 1 mirroring memory 222 is 4 GB in size, then channel 1 unmirrored memory 218 may include the remaining 12 GB of available memory in channel 1 DIMM 214.

A starting address for channel 1 mirroring memory 222 may be determined in several ways. For example, channel 1 mirroring memory may be selected to be adjacent to channel 0 mirrored memory 220 in a logical system memory address space. For example, an operating system or virtual machine manager may determine the mirroring range by calculating a start and end of a region that is adjacent to the mirrored region and that is the same size as the mirrored region. For example, if the requested mirror range is from 20 GB to 24 GB, then the aliased range will be from 16 GB to 20 GB (as the same size range as the requested range is removed to form the mirroring region, right below the mirrored region in the address space). Alternatively, a starting address of channel 1 mirroring memory 222 may be located at a fixed location in a DIMM or other memory component. Any other suitable location for channel 1 mirroring memory 222 may be utilized. Because channel 1 mirroring memory 222 is configured as a mirror, the effective memory addressable by an operating system or virtual machine manager is reduced by the size of the mirroring region. Channel 1 mirroring memory 222 provides redundancy by accepting read requests if there is an error in channel 0 mirrored memory 220. In some embodiments, a write to channel 0 mirrored memory 220 may be sent to both channel 0 mirrored memory 220 and to channel 1 mirroring memory 222.

Accordingly, channel 1 mirroring memory 222 may retain a duplicate copy of the data in channel 0 mirrored memory 220.

An address hole is formed when mirroring is setup because a mirroring region is no longer useable to store other data. Typically, an operating system or virtual machine manager will be aware of the hole, and will not access this range. However, a malicious or erroneous access to this hole might result in a fatal condition (e.g., a machine check) as there is no physical memory associated with this address hole. Accordingly, a mirroring memory region may be aliased by remaining visible to the operating system or virtual machine manager, but may disregard write requests. Specifically, although writes are permitted to channel 0 mirrored memory, writes to channel 1 mirroring memory 222 may be disregarded.

Figure 3:
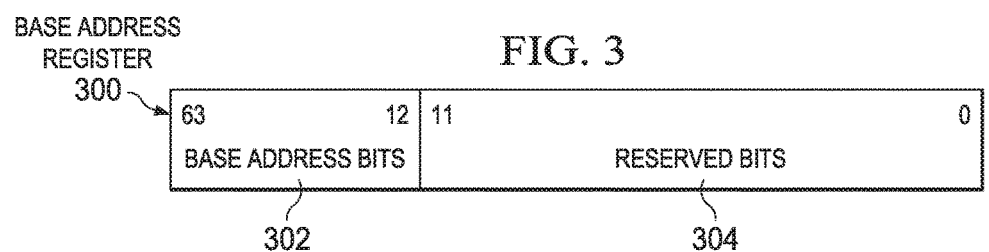
FIG. 3 is a block diagram of a base address register, according to some embodiments of the present disclosure.

FIG. 3 is a block diagram of a base address register 300, according to some embodiments of the present disclosure. Base address register 300 may have features that are similar to base address register 208, discussed above with reference to FIG. 2. In some embodiments, base address register 300 may be a model specific register. Base address register 300 may include any suitable number of bits. For example, base address register 300 may be a 512-bit, 256-bit, 128-bit, 64-bit, or 32-bit register, or may include any other suitable number of bits. Base address register 300 may be subdivided into one or more fields. For example, base address register 300 may include base address bits 302. Base address bits 302 may store data representing a start address for a memory region to be mirrored. In a 64-bit processor, a typical memory address is 64-bits wide. However, often memory is typically divided into logical blocks, known as pages. In some embodiments, base address register 300 may be configured to be writeable with values that indicate the beginning of a page. For example, base address bits 302 may be restricted to values representing page breaks by disregarding one or more of the least significant bits of the register, depending the size of a page. In one example, base address bits 302 may be 52 bits wide. Accordingly, base address register 300 may further include reserved bits 304, reserved bits 304 may be disregarded for the purposes of memory mirroring, but might be useable for some other purpose.

In one example, reserved bits 304 may be used to determine a minimum granularity of a size of a memory region to be mirrored. In some embodiments, reserved bits in a base address register may be hardwired to 0. Accordingly, an operating system or virtual machine manager may write all 1's to a base address register to determine the allowable granularity of mirroring. When all 1's are written to a base address register, writes to bits that are hardwired to 0 will not change the state of the bits. The operating system or virtual machine manager may read data back from the base address register. An operating system or virtual machine manager may determine a minimum mirroring granularity based on the read data. For example, an operating system or virtual machine manager may determine a minimum mirroring granularity by comparing the written test data to the data that was read back. In some embodiments, one or more of the least significant bits of the returned data will not match the test data because those status bits in the end address register are hardwired to 0 and cannot be overwritten. Accordingly, the minimum granularity may be two to the power of the number of changed bits (i.e., $2^{number\ of\ bits}$). For example, if the lower 20 bits are reserved bits that are hardwired to 0, then the granularity is 1 MB (i.e., $2^{20}$ bits) and the operating system or virtual machine manager can request mirror ranges in multiples of 1 MB. In some embodiments, a minimum granularity may be chosen to be 4 KB, which is a typical size of memory page. Accordingly, the lower 12 bits of a corresponding base address register would be hardwired to 0. In other embodiments, the mirroring granularity may be smaller or larger.

Figure 4:
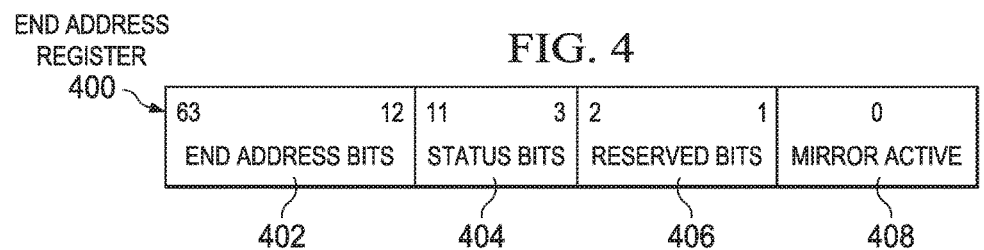
FIG. 4 is a block diagram of an end address register, according to some embodiments of the present disclosure.

FIG. 4 is a block diagram of an end address register 400, in accordance with embodiments of the present disclosure. End address register 400 may include features that are similar to end address register 210, which is discussed above with reference to FIG. 2. In some embodiments, end address register 400 may be a model specific register. End address register 400 may include any suitable number of bits. For example, end address register 400 may be a 512-bit, 256-bit, 128-bit, 64-bit, or 32-bit register, or may include any other suitable number of bits. End address register 400 may be subdivided into one or more fields. For example, end address register 400 may include end address bits 402. In some embodiments, end address bits 402 may specify a size of a mirrored memory region. In other embodiments, end address bits 402 may specify a range between a start and end of a mirrored region (i.e., the size of a mirrored region). In combination with a start address, such as base address bits 302, end address bits 402 may specify an end address of a memory mirroring region. As discussed above with reference to FIG. 3, memory is typically divided into logical blocks, known as pages. Base address register 300 may be configured to be writeable with values that indicate the beginning of a page. The values of end address bits 402 may also be restricted to those defining an end address that corresponds to a page break by disregarding one or more of the least significant bits of the register, depending the size of a page. For example, in some embodiments, end address bits 402 may be 52 bits wide.

End address register 400 may store additional information, in some embodiments. For example, end address register 400 may include status bits 404. Status bits 404 may be configured to maintain information regarding a status of a memory mirroring region or a mirrored memory region. For example, in one embodiment, status bits 404 may be set to a default value (such as all 0's) prior to receiving a request to mirror a portion of memory. If a memory mirror request is successful, status bits 404 may remain at their default value to indicate the absence of an error. For example, in some embodiments, each bit within status bits 404 may be set to 0. In the event of a failure, a memory controller may set one or more of status bits 404 to different values, depending on the nature of the failure.

In some embodiments, if a base address fails to align with a page break, a memory controller may write a first status code to status bits 404. In some embodiments, the status code representing a failed start address may be 0x01.

Similarly, if an end address fails to correspond to a page break, a memory controller may write a second status code to status bits 404. In some embodiments, the status code representing a failed end address may be 0x02.

Additionally, if a specified end address is higher than a specified base address, a memory controller may write a third status code to status bits 404. In some embodiments, the status code representing an end address being higher than a base address may be 0x03.

In some embodiments, if a break in the mirror is detected, a memory controller may write a fourth status code to status bits 404. In some embodiments, the status code representing a break in the mirror may be 0xFF. A memory controller may include circuitry or logic to detect errors in a memory. Furthermore, a memory controller may include circuitry or logic to determine a rate of errors over time, or to determine a total number of errors. A mirror break may occur when a rate or number of errors in the primary region crosses a predetermined threshold. Upon detecting a mirror break, a memory controller may also trigger a Correctable Machine Check Interrupt to indicate a break. In some embodiments, an operating system or virtual machine manager may interrogate status bits 404 to determine the cause of the interrupt and comprehend the loss of redundancy.

In some embodiments, end address register 400 may also include a mirror active bit 408. Mirror active bit 408 may store information indicating whether a mirror is currently active (i.e., whether any portion of the memory associated with a memory controller is currently mirrored). End address register 400 may also include one or more reserved bits 406.

Although various examples, of status bits have been described with reference to FIG. 4, these examples are not intended to be limiting. In some embodiments, status bits, such as those described above, may be stored in a register other than end address register 408. In some embodiments, the values of status bits 404 may use different codes to signify different states of memory mirroring. The values of status bits 404 may have more or fewer status codes, and may store different information about memory mirroring.

FIG. 5 is a flowchart illustrating a method 500 of initiating dynamic address based mirroring, in accordance with embodiments of the present disclosure. Method 500 may be implemented by any of the elements shown in FIGS. 1-4. Method 500 may be initiated by any suitable criteria and may initiate operation at any suitable point. In one embodiment, method 500 may initiate operation at 505. Method 500 may include greater or fewer steps than those illustrated. Moreover, method 500 may execute its steps in an order different than those illustrated. Method 500 may terminate at any suitable step. Moreover, method 500 may repeat operation at any suitable step. Method 500 may perform any of its steps in parallel with other steps of method 500, or in parallel with steps of other methods.

At 505, an operating system or virtual machine manager may identify memory associated with a memory controller. For example, in some embodiments, an operating system or virtual machine manager may read the memory device descriptors from an advanced power and configuration interface (ACPI) Memory to comprehend the range of memory addresses fielded by each memory controller device. For example, in the embodiment illustrated in FIG. 2, an operating system or virtual machine manager may determine that memory controller 206 is connected to two DIMMs. The operating system or virtual machine manager may further determine the amount of available memory space in each DIMM. For example, memory controller 206 may be coupled to two 16 GB DIMMs.

At 510, an operating system or virtual machine manager may vacate a portion of memory to be used as the mirroring portion. Prior to configuring dynamic address based memory mirroring, an operating system or virtual machine manager may be configured to use all of the memory associated with a memory controller. Because a mirroring portion of memory may be used to store a copy of the data in a mirrored portion, the mirroring portion cannot also be used for other purposes. Accordingly, an operating system or virtual machine manager may cause a memory controller to stop writing information to a portion of memory that is to be used as a mirroring memory. Furthermore, an operating system or virtual machine manager may cause current contents of a mirroring portion of memory to be migrated to another memory location or to be evicted to another storage device. For example, in the embodiment illustrated in FIG. 2, an operating system or virtual machine manager may cause memory controller 206 to vacate channel 1 mirroring memory 222. A operating system or virtual machine manager may further cause memory controller 206 to cease writing information into the portion of DIMM 214 to be used as channel 1 mirroring memory 222.

At 515, an operating system or virtual machine manager may request that a range of memory be mirrored. In some embodiments, an operating system or virtual machine manager may issue a request for mirroring by writing information to one or more mirror address range registers, such as mirror address range registers 206, discussed above with reference to FIG. 2. In some embodiments, a requested mirror address range may fall within memory associated with a single memory controller. For example, a requested mirror range may fall within the range determined at 505. A request to mirror a range of memory may cause platform firmware to execute various functions associated with memory mirroring. For example, a request to mirror a portion of memory may cause performance of methods 600 or 700, discussed below with reference to FIGS. 6-7.

At 520, an operating system or virtual machine manager may receive a notification that mirroring is operational. Upon receiving such a notification, an operating may return to normal operation. In some embodiments, an operating system or virtual machine manager retirement of a write instruction to mirror address range registers may constitute a notification that mirroring is operational. For example, an operating may detect termination of a write instruction to mirror address range registers 206, discussed above with reference to FIG. 2.

FIG. 6 is a flow chart illustrating a method 600 of determining the granularity of memory mirroring regions that can be specified with memory mirroring registers in accordance with embodiments of the present disclosure. Method 600 may be implemented by any of the elements shown in FIGS. 1-5. Method 600 may be initiated by any suitable criteria and may initiate operation at any suitable point. In one embodiment, method 600 may initiate operation at 605. Method 600 may include greater or fewer steps than those illustrated. Moreover, method 600 may execute its steps in an order different than those illustrated. Method 600 may terminate at any suitable step. Moreover, method 600 may repeat operation at any suitable step. Method 600 may perform any of its steps in parallel with other steps of method 600, or in parallel with steps of other methods.

At 605, an operating system or virtual machine manager may write test data to a base address register. In some embodiments, reserved bits in a base address register may be hardwired to 0. Accordingly, an operating system or virtual machine manager may write all 1's to a base address register to determine the allowable granularity of mirroring. When all 1's are written to a base address register, writes to bits that are hardwired to 0 will not change the state of the bit.

At 610, an operating system or virtual machine manager may read data from the base address register. An operating system or virtual machine manager may use any suitable mechanism for reading data from the register.

At 615, an operating system or virtual machine manager may determine minimum mirroring granularity based on the read data. For example, an operating system or virtual machine manager may determine a minimum mirroring granularity by comparing the written test data to the data that was read back. In some embodiments, one or more of the least significant bits of the returned data will not match the test data because those status bits in the end address register are hardwired to 0 and cannot be overwritten. Accordingly, the minimum granularity may be two to the power of the number of changed bits (i.e., $2^{number\ of\ bits}$). For example, if the lower 20 bits are reserved bits that are hardwired to 0, then the granularity is 1MB (i.e., $2^{20}$ bits) and the operating system or virtual machine manager can request mirror ranges in multiples of 1 MB. In some embodiments, a minimum granularity may be chosen to be 4 KB, which is a typical size of memory page. Accordingly, the lower 12 bits of a corresponding base address register would be hardwired to 0. In other embodiments, the mirroring granularity may be smaller or larger.

FIG. 7 is a flowchart illustrating a method 700 of implementing dynamic address based mirroring, in accordance with embodiments of the present disclosure. Method 700 may be implemented by any of the elements shown in FIGS. 1-6. Method 700 may be initiated by any suitable criteria and may initiate operation at any suitable point. In one embodiment, method 700 may initiate operation at 705. Method 700 may include greater or fewer steps than those illustrated. Moreover, method 700 may execute its steps in an order different than those illustrated. Method 700 may terminate at any suitable step. Moreover, method 700 may repeat operation at any suitable step. Method 700 may perform any of its steps in parallel with other steps of method 700, or in parallel with steps of other methods.

At 705, a BIOS or pCode may receive a signal to initiate memory mirroring. For example, a BIOS or pCode may detect that data has been written to one or more mirror address range registers, such as mirror address range registers 206, discussed above with reference to FIG. 2. In some embodiments, processor firmware may send a notification or other signal to the BIOS or pCode.

At 710, the BIOS or pCode may validate the values programmed in a base address register and in an end address register. For example, the BIOS or pCode may determine whether the beginning and end of a requested mirrored region comply with minimum mirroring granularity requirements. In other words, the BIOS or pCode may ensure that they follow the granularity and alignment rules, and that they fall within the address range of the memory controller in question.

At 715, the BIOS or pCode may calculate the system address decoder values. Based on the requested mirroring range, BIOS or pCode may translate a logical address into a physical memory address. An operating system or virtual machine manager may view memory space as a series of logical addresses. Accordingly, a memory controller may contain a decoder to map logical address to physical memory addresses. In some embodiments, upon receiving a request to mirror a particular range of logical addresses, a memory controller may determine a range of physical memory addresses associated with the range of logical memory addresses.

At 720, the BIOS or pCode may determine a location for a memory mirroring region. In some embodiments, a mirroring region may be adjacent to a mirrored region. For example, an operating system or virtual machine manager may request mirroring for a portion of memory spanning the logical address from 20 GB to 24 GB. In response, the BIOS or pCode may locate a mirroring region adjacent to these logical addresses. Accordingly, the BIOS or pCode may locate a mirroring region between the logical address from 16 GB and 20 GB. Alternatively, the BIOS or pCode may specify any arbitrary range of memory for use as a memory mirroring region. For example, the BIOS or pCode may locate a mirroring region at the highest possible addresses within a memory space, the BIOS or pCode may locate a mirroring region within one or more predefined regions, or the BIOS or pCode may locate a mirroring region in any other suitable location within a memory.

At 725, the BIOS or pCode may quiesce traffic to a mirroring region. Specifically, BIOS or pCode may reject new write operations to a mirroring region. Furthermore, BIOS or pCode may include circuitry or logic to cause a system to wait until any in-progress operations that target the mirroring region have completed.

At 730, the BIOS or pCode may program the system decoders with values calculated at 715. BIOS or pCode may program a memory controller decoder after any in-progress transactions to the mirroring region have completed. Accordingly, BIOS or pCode may program a memory decoder with the values calculated at 715 after traffic has been quiesced to the targeted mirroring region.

At 735, the BIOS or pCode may unqueisce the system. After the decoder has been reprogrammed, the BIOS or pCode may unquiesce the system and allow the system to begin using the mirrored memory. Because the BIOS or pCode may unquiesce the system without a reboot, dynamic address based mirroring may be implemented or activated without rebooting a processor or a system. Accordingly, dynamic address based mirroring may increase system uptime.

Figure 8:
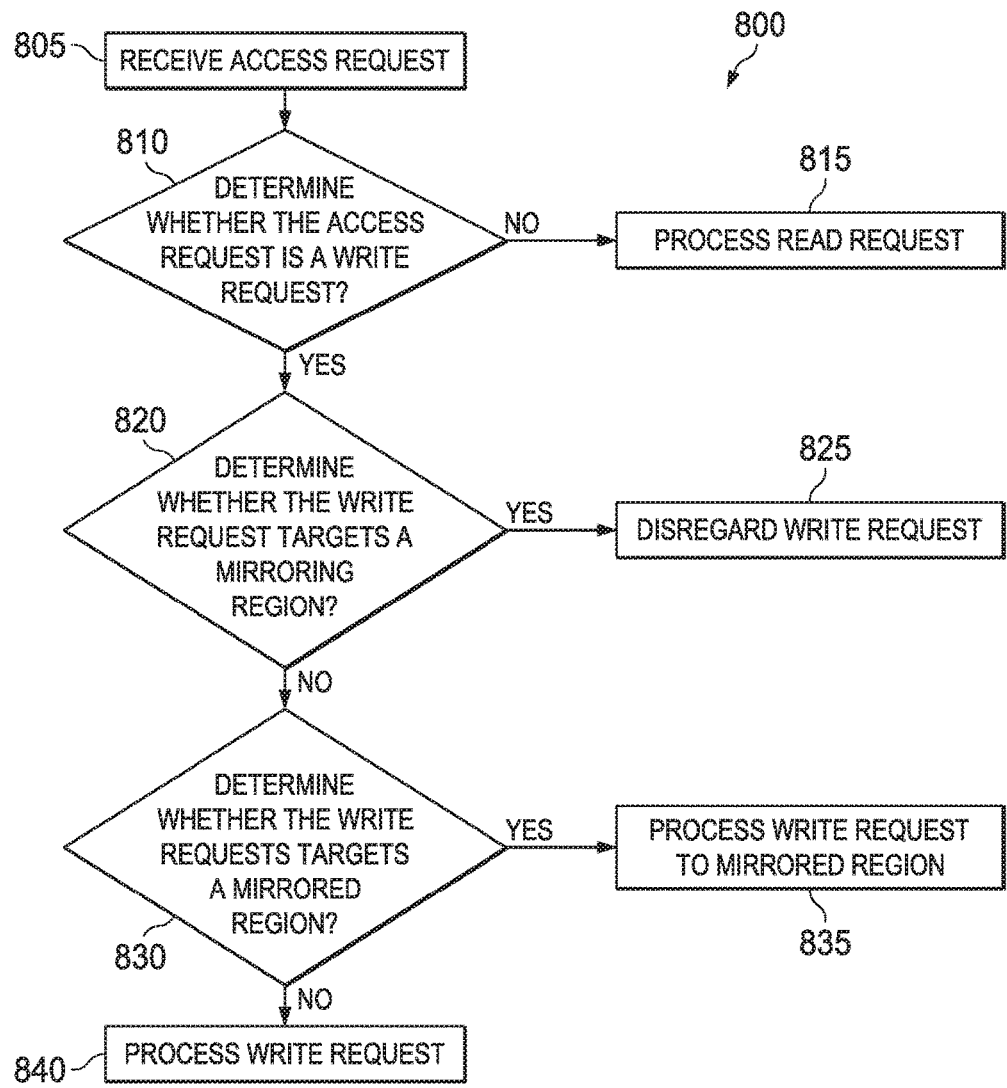
FIG. 8 is a flowchart illustrating a method of processing an access request when dynamic address based mirroring is enabled, in accordance with embodiments of the present disclosure.

FIG. 8 is a flowchart illustrating a method 800 of processing an access request when dynamic address based mirroring is enabled, in accordance with embodiments of the present disclosure. Method 800 may be implemented by any of the elements shown in FIGS. 1-7. Method 800 may be initiated by any suitable criteria and may initiate operation at any suitable point. In one embodiment, method 800 may initiate operation at 805. Method 800 may include greater or fewer steps than those illustrated. Moreover, method 800 may execute its steps in an order different than those illustrated. Method 800 may terminate at any suitable step. Moreover, method 800 may repeat operation at any suitable step. Method 800 may perform any of its steps in parallel with other steps of method 800, or in parallel with steps of other methods.

At 805, a memory controller may receive an access request. An access request may include either a read operation, or a write operation.

At 810, the memory controller may determine whether the request is a write request. If the access request is not a write request, then method 800 may proceed to 815. If the access request is a write request, method 800 may proceed to 820.

At 815, the memory controller may process a read request normally. In some embodiments, a memory controller may read data from a portion of memory regardless of whether such a portion is part of a mirrored region, mirroring region. Accordingly, if an access request is a read request, a memory controller may process such a request normally.

At 820, the memory controller may determine whether a write request targets a mirroring region. If the write request targets a mirroring region, method 800 may proceed to 825. If the write request does not target a mirroring region, method 800 may proceed to 830.

At 825, the memory controller may disregard the write request. A mirroring region is intended to duplication the contents of a mirrored region. Allowing a memory controller to process a write request to a mirroring region would break the mirror because the contents of the minoring region would no longer match the contents of the mirrored region. Accordingly, a memory controller may disregard a write request to a minoring region.

At 830, the memory controller may determine whether a write request targets a mirrored region. If the write request targets a mirrored region, method 800 may proceed to 835. If the write request does not target a mirrored region, method 800 may proceed to 840.

At 835, the memory controller may process a write request to a mirrored region. A minoring region is intended to duplicate the contents of a mirrored region. Accordingly, to maintain duplication, a memory controller may process a write request to a mirrored region by writing data to both the mirrored region and to a corresponding mirroring region. Accordingly, each time the contents of the mirrored region are changed by overwriting data, the contents of the minoring region will also be changed.

At 840, the memory controller may process a write request. If a write request does not target a mirrored region or a minoring region, such a write request may be processed normally. Specifically, in the absence of any other constraints on write access to the targeted portion of memory, data should be written to memory in accordance with the write request.

The figures described below include detailed examples of architectures and systems to implement embodiments of the hardware components and/or instructions described above. In some embodiments, one or more hardware components and/or instructions described above may be emulated as described in detail below, or may be implemented as software modules.

Example Core Architectures, Processors, and Computer Architectures

Processor cores may be implemented in different ways, for different purposes, and in different processors. For instance, in various embodiments, such cores may include a general purpose in-order core intended for general-purpose computing, a high-performance general purpose out-of-order core intended for general-purpose computing, and/or a special purpose core intended primarily for graphics and/or scientific computing (e.g., high throughput computing). In various embodiments, different processors may include a CPU, including one or more general purpose in-order cores intended for general-purpose computing and/or one or more general purpose out-of-order cores intended for general-purpose computing, and a coprocessor, including one or more special purpose cores intended primarily for graphics and/or scientific computing (e.g., high throughput computing). Such different processors may lead to different computer system architectures, in different embodiments. For example, in some embodiments, a coprocessor may be on a separate chip than a CPU. In other embodiments, a coprocessor may be on a separate die than a CPU, but may be in the same package as the CPU. In some embodiments, a coprocessor may be on the same die as a CPU. In this case, the coprocessor may sometimes be referred to as special purpose logic, which may include integrated graphics and/or scientific logic (e.g., high throughput logic), or as a special purpose core. In some embodiments, a system on a chip may include, on the same die, a CPU as described above (which may be referred to as the application core(s) or application processor(s)), a coprocessor as described above, and additional functionality. Example core architectures, processors, and computer architectures are described below, according to some embodiments.

Example Core Architectures

In-Order and Out-of-Order Core Block Diagram

Figure 9A:
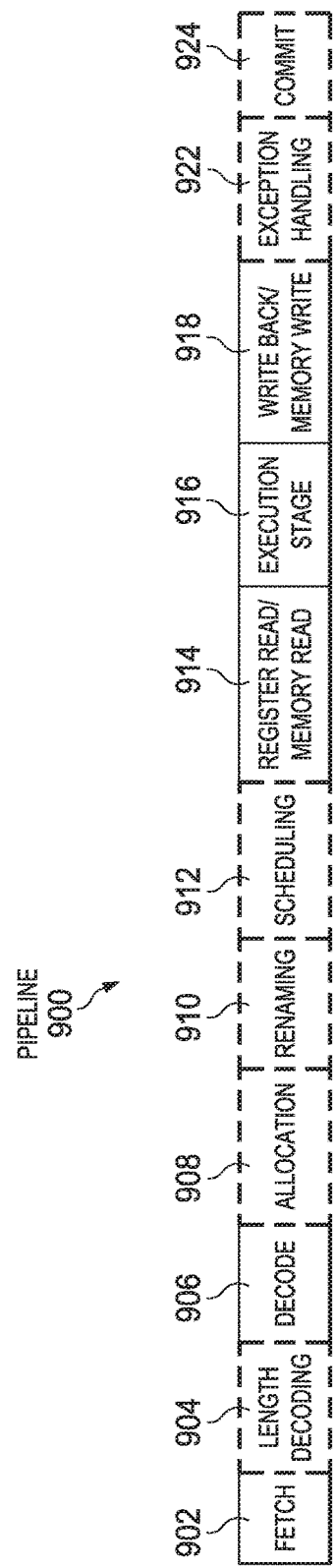
FIG. 9A is a block diagram illustrating an in-order pipeline and a register renaming, out-of-order issue/execution pipeline, according to some embodiments of the present disclosure.
Figure 9B:
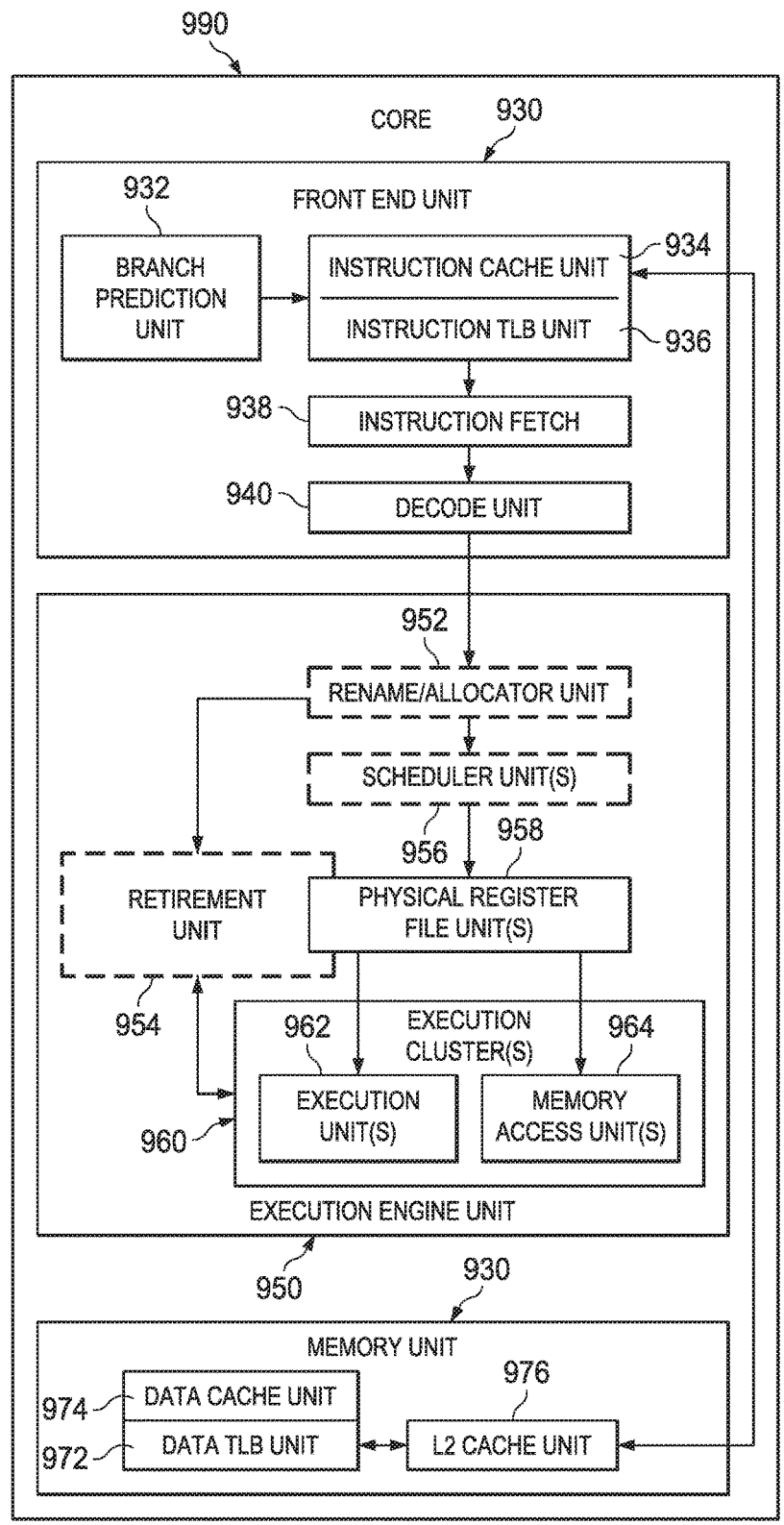
FIG. 9B is a block diagram illustrating an in-order architecture core and register renaming, out-of-order issue/execution logic to be included in a processor, according to some embodiments of the present disclosure.

FIG. 9A is a block diagram illustrating an example in-order pipeline and a register renaming, out-of-order issue/execution pipeline, according to some embodiments. FIG. 9B is a block diagram illustrating an in-order architecture core and register renaming, out-of-order issue/execution logic to be included in a processor, according to some embodiments. The solid lined boxes in FIG. 9A illustrate the in-order pipeline, while the dashed lined boxes illustrate the register renaming, out-of-order issue/execution pipeline. Similarly, the solid lined boxes in FIG. 9B illustrate the in-order architecture logic, while the dashed lined boxes illustrate the register renaming logic and out-of-order issue/execution logic In FIG. 9A, a processor pipeline 900 includes a fetch stage 902, a length decoding stage 904, a decode stage 906, an allocation stage 908, a renaming stage 910, a scheduling stage 912 (also known as a dispatch or issue stage), a register read/memory read stage 914, an execution stage 916, a write back/memory write stage 918, an exception handling stage 922, and a commit stage 924.

In FIG. 9B, arrows denote a coupling between two or more units and the direction of the arrow indicates a direction of data flow between those units. In this example, FIG. 9B illustrates a processor core 990 including a front end unit 930 coupled to an execution engine unit 950, both of which may be coupled to a memory unit 970. The core 990 may be a reduced instruction set computing (RISC) core, a complex instruction set computing (CISC) core, a very long instruction word (VLIW) core, or a core of a hybrid or alternative core type, in different embodiments. In various embodiments, core 990 may be a special-purpose core, such as, for example, a network core, a communication core, a compression engine, a coprocessor core, a general-purpose computing graphics processing unit (GPGPU) core, a graphics core, or another type of special-purpose core.

In this example, front end unit 930 includes a branch prediction unit 932 coupled to an instruction cache unit 934. Instruction cache unit 934 may be coupled to an instruction translation lookaside buffer (TLB) 936. TLB 936 may be coupled to an instruction fetch unit 938, which may be coupled to a decode unit 940. Decode unit 940 may decode instructions, and may generate as an output one or more micro-operations, micro-code entry points, microinstructions, other instructions, or other control signals, which are decoded from, or which otherwise reflect, or are derived from, the original undecoded instructions. Decode unit 940 may be implemented using any of a variety of suitable mechanisms, in different embodiments. Examples of suitable mechanisms may include, but are not limited to, look-up tables, hardware circuitry, programmable logic arrays (PLAs), microcode read only memories (ROMs). In one embodiment, instruction cache unit 934 may be further coupled to a level 2 (L2) cache unit 976 in memory unit 970. In one embodiment, the core 990 may include a microcode ROM or other medium that stores microcode for certain macroinstructions (e.g., within decode unit 940 or elsewhere within the front end unit 930). The decode unit 940 may be coupled to a rename/allocator unit 952 within the execution engine unit 950.

In this example, execution engine unit 950 includes the rename/allocator unit 952, which may be coupled to a retirement unit 954 and a set of one or more scheduler unit(s) 956. Scheduler unit(s) 956 may represent any number of different schedulers of various types, including those that implement reservations stations or those that implement a central instruction window. As illustrated in this example, scheduler unit(s) 956 may be coupled to physical register file unit(s) 958. Each of the physical register file units 958 may represent one or more physical register files, different ones of which store data of one or more different data types including, but not limited to, scalar integer, scalar floating point, packed integer, packed floating point, vector integer, vector floating point, or status data types. One example of the use of a status data type may be an instruction pointer that indicates the address of the next instruction to be executed. In one embodiment, a physical register file unit 958 may include a vector register unit, a write mask register unit, and a scalar register unit (not shown). These register units may provide architectural vector registers, write mask registers (e.g., vector mask registers), and general-purpose registers. In some embodiments, these registers may be similar to the registers illustrated in FIGURE QAD and described above.

In FIG. 9B, the physical register file unit(s) 958 are shown as being overlapped by the retirement unit 954 to illustrate various ways in which register renaming and out-of-order execution may be implemented. For example, in different embodiments, register renaming and out-of-order execution may be implemented using one or more reorder buffers and one or more retirement register files; using one or more future files, one or more history buffers, and one or more retirement register files; or using register maps and a pool of registers. In general, the architectural registers may be visible from the outside of the processor and/or from a programmer's perspective. The registers are not limited to any particular known type of circuit. Rather, any of a variety of different types of registers may be suitable for inclusion in core 990 as long as they store and provide data as described herein. Examples of suitable registers include, but are not limited to, dedicated physical registers, dynamically allocated physical registers using register renaming, and combinations of dedicated and dynamically allocated physical registers. In the example illustrated in FIG. 9B, retirement unit 954 and physical register file unit(s) 958 are coupled to the execution cluster(s) 960. Each of execution clusters 960 may include a set of one or more execution units 962 and a set of one or more memory access units 964. Execution units 962 may perform various operations (e.g., shifts, addition, subtraction, multiplication) and may operate on various types of data (e.g., scalar floating point, packed integer, packed floating point, vector integer, vector floating point). While some embodiments may include a number of execution units dedicated to specific functions or sets of functions, other embodiments may include only one execution unit, or may include multiple execution units all of which perform all supported functions or operations. In the example illustrated in FIG. 9B, scheduler unit(s) 956, physical register file unit(s) 958, and execution cluster(s) 960 are shown as potentially including a plurality of such units since some embodiments include separate pipelines for certain types of data/operations. For example, some embodiments may include a scalar integer pipeline, a scalar floating point/packed integer/packed floating point/vector integer/vector floating point pipeline, and/or a memory access pipeline, each of which includes its own scheduler unit, physical register file unit, and/or execution cluster. In some embodiments that include a separate memory access pipeline, only the execution cluster of this pipeline includes a memory access unit 964. It should also be understood that where separate pipelines are used, one or more of these pipelines may be out-of-order issue/execution pipelines and the rest may be in-order execution pipelines.

In the example illustrated in FIG. 9B, the set of memory access units 964 may be coupled to the memory unit 970, which includes a data TLB unit 972. Data TLB unit 972 may be coupled to a data cache unit 974, which in turn may be coupled to a level 2 (L2) cache unit 976. In one example embodiment, the memory access units 964 may include a load unit, a store address unit, and a store data unit, each of which may be coupled to the data TLB unit 972 in the memory unit 970. The L2 cache unit 976 may be coupled to one or more other levels of cache and, eventually, to a main memory. While FIG. 9B illustrates an embodiment in which instruction cache unit 934, data cache unit 974, and level 2 (L2) cache unit 976 reside within core 990, in other embodiments one or more caches or cache units may be internal to a core, external to a core, or apportioned internal to and external to a core in different combinations.

In one example embodiment, the register renaming, out-of-order issue/execution core architecture illustrated in FIG. 9B may implement pipeline 900 illustrated in FIG. 9B as follows. The instruction fetch unit 938 may perform the functions of the fetch and length decoding stages 902 and 904. The decode unit 940 may perform the functions of decode stage 906. The rename/allocator unit 952 may perform the functions of the allocation stage 908 and the renaming stage 910. The scheduler unit(s) 956 may perform the functions of the scheduling stage 912. The physical register file unit(s) 958 and the memory unit 970 may, collectively, perform the functions of the register read/memory read stage 914. The execution cluster(s) 960 may perform the functions of the execution stage 916. The memory unit 970 and the physical register file unit(s) 958 may, collectively, perform the functions of the write back/memory write stage 918. In different embodiments, various units (some of which may not be shown) may be involved in performing the functions of the exception handling stage 922. The retirement unit 954 and the physical register file unit(s) 958 may, collectively, perform the functions of the commit stage 924. In different embodiments, core 990 may support one or more instructions sets, including the instruction(s) described herein. For example, in various embodiments, core 990 may support the x86 instruction set (with or without extensions that have been included in recent versions); the MIPS instruction set of MIPS Technologies of Sunnyvale, Calif.; and/or the ARM instruction set of ARM Holdings of Sunnyvale, Calif. (with or without optional additional extensions such as NEON. In one embodiment, core 990 may include logic to support a packed data instruction set extension (e.g., AVX1 or AVX2), thereby allowing the operations used by many multimedia applications to be performed using packed data.

In some embodiments, core 990 may support multithreading (e.g., executing two or more parallel sets of operations or threads), and may do so in a variety of ways. Core 990 may, for example, include support for time sliced multithreading, simultaneous multithreading (in which a single physical core provides a logical core for each of the threads that the physical core is simultaneously executing), or a combination of time sliced and simultaneous multithreading. In one embodiment, for example, core 990 may include support for time sliced fetching and decoding, and for simultaneous multithreading in subsequent pipeline stages, such as in the Intel® Hyperthreading technology.

While register renaming is described herein in the context of out-of-order execution, it should be understood that register renaming may be used in an in-order architecture, in some embodiments. While in the example embodiment illustrated in FIG. 9B, core 990 includes separate instruction and data cache units 934 and 974, respectively, and a shared L2 cache unit 976, in other embodiments core 990 may include a single internal cache for both instructions and data, such as, for example, a Level 1 (L1) internal cache, or multiple levels of internal cache. In some embodiments, the system may include a combination of an internal cache and an external cache (e.g., a cache that is external to the core and/or the processor). In other embodiments, all of the caches may be external to the core and/or the processor.

Specific Example In-Order Core Architecture

Figure 10A:
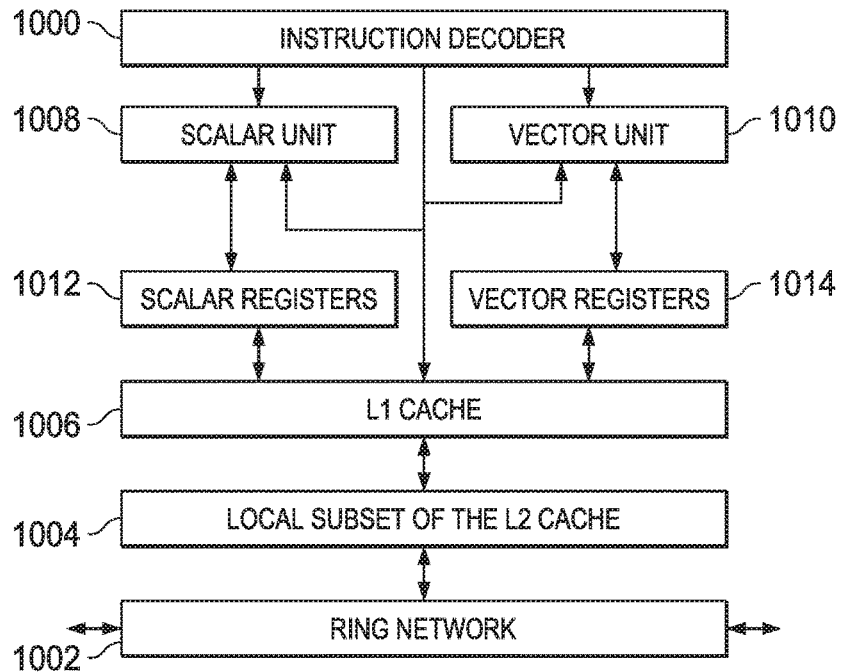
FIGS. 10A and 10B are block diagrams illustrating an example in-order core architecture, according to some embodiments of the present disclosure.
Figure 10B:
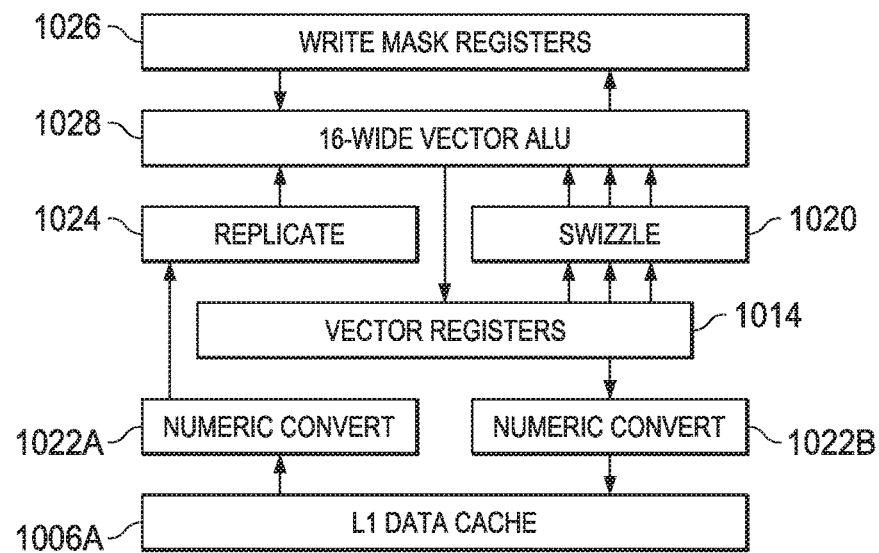

FIGS. 10A and 10B are block diagrams illustrating a more specific example of an in-order core architecture in which a core may be one of several logic blocks (including, for example, other cores of the same type and/or of different types) in a chip. As illustrated in this example, the logic blocks may communicate through a high-bandwidth, on-die interconnect network (e.g., a ring network) with some fixed function logic, memory I/O interfaces, and other necessary I/O logic, depending on the application.

FIG. 10A is a block diagram illustrating a single processor core, along with its connections to an on-die interconnect network (shown as ring network 1002) and to its local subset of a Level 2 (L2) cache 1004, according to some embodiments. In one embodiment, an instruction decoder 1000 may support the x86 instruction set with a packed data instruction set extension. An L1 cache 1006 may allow low-latency accesses to cache memory by the scalar and vector units. In one embodiment (e.g., to simplify the design), a scalar unit 1008 and a vector unit 1010 may use separate register sets (e.g., scalar registers 1012 and vector registers 1014, respectively) and data that is transferred between them may be written to memory and then read back in from level 1 (L1) cache 1006. However, other embodiments may use a different approach. For example, they may include a single register set or may include a communication path that allows data to be transferred between the two register files without being written to memory and read back.

In this example, the local subset of the L2 cache 1004 may be part of a global L2 cache that is divided into separate local subsets, e.g., with one subset per processor core. Each processor core may have a direct access path to its own local subset of the L2 cache 1004. Data read by a processor core may be stored in its L2 cache subset 1004 from which it can be accessed quickly and in parallel with accesses by other processor cores to their own local L2 cache subsets. Data written by a processor core and stored in its own L2 cache subset 1004 may be flushed from other L2 cache subsets, if necessary. In some embodiments, the ring network 1002 may ensure coherency for shared data. The ring network may be bi-directional to allow agents such as processor cores, L2 caches and other logic blocks to communicate with each other within the chip. In one embodiment, each ring datapath may be 1012 bits wide per direction.

FIG. 10B illustrates an expanded view of part of the processor core illustrated in FIG. 10A, according to some embodiments. In this example, FIG. 10B includes an L1 data cache 1006A, which may be part of the L1 cache 1004, as well as more detail regarding the vector unit 1010 and the vector registers 1014. Specifically, the vector unit 1010 may be a 16-wide vector processing unit (VPU) that includes a 16-wide vector ALU 1028. ALU 1028 may be configured to execute one or more of integer, single-precision float, and double-precision float instructions. The VPU may also support swizzling the register inputs (using swizzle unit 1020), numeric conversion (using numeric convert units 1022A and 1022B), and replication (using replication unit 1024) on the memory input. The inclusion of write mask registers 1026 may allow for predicating resulting vector writes.

Figure 11:
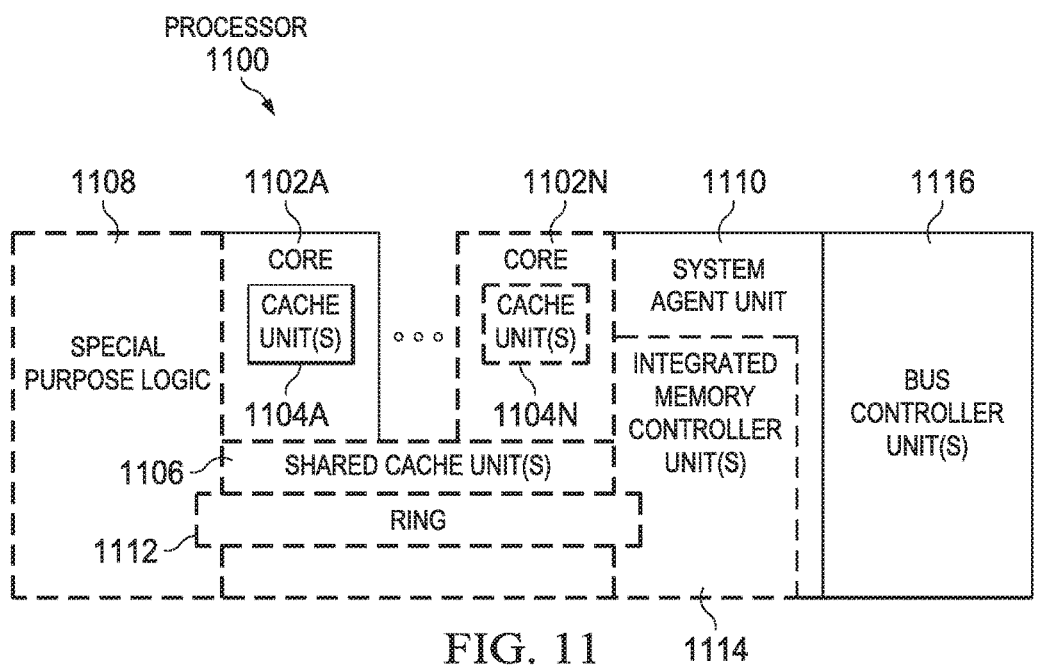
FIG. 11 illustrating a block diagram illustrating a processor, according to some embodiments of the present disclosure.

FIG. 11 is a block diagram illustrating a processor 1100 that may, in some embodiments, include more than one core, an integrated memory controller, and/or may special purpose logic (such as for integrated graphics computing). The solid lined boxes in FIG. 11 illustrate a processor 1100 that includes a single core 1102A, a system agent 1110, and a set of one or more bus controller units 1116. With the optional addition of the dashed lined boxes, an alternative embodiment of processor 1100 includes multiple cores 1102A-1102N, and also includes a set of one or more integrated memory controller unit(s) 1114 within the system agent unit 1110, and special purpose logic 1108. In some embodiments, one or more of cores 1102A-1102N may be similar to processor core 990 illustrated in FIG. 9B or the processor core illustrated in FIGS. 10A and 10B.

In some embodiments, processor 1100 may represent a CPU in which the special purpose logic 1108 includes integrated graphics and/or scientific logic (which may include one or more cores), and in which the cores 1102A-1102N include one or more general purpose cores (e.g., general purpose in-order cores, general purpose out-of-order cores, or a combination of the two). In other embodiments, processor 1100 may represent a coprocessor in which the cores 1102A-1102N include a large number of special purpose cores intended primarily for graphics and/or scientific computing (e.g., high throughput computing). In still other embodiments, processor 1100 may represent a coprocessor in which the cores 1102A-1102N include a large number of general purpose in-order cores. Thus, in different embodiments, the processor 1100 may be a general purpose processor, a coprocessor, or a special purpose processor, such as, for example, a network or communication processor, compression engine, graphics processor, GPGPU (general purpose graphics processing unit), a high-throughput "many integrated core" (MIC) coprocessor (including, for example, 30 or more cores), an embedded processor, or another type of processor. The processor 1100 may be implemented on one chip or on more than one chip, in different embodiments. The processor 1100 may be a part of and/or may be implemented on one or more substrates using any of a number of process technologies, such as, for example, BiCMOS, CMOS, or NMOS.

In the example illustrated in FIG. 11, the memory hierarchy includes one or more levels of cache within each of the cores 1102A-1102N, shown as cache units 1104A-1104N, a set of one or more shared cache units 1106, and external memory (not shown), some or all of which are coupled to the set of integrated memory controller units 1114. The set of shared cache units 1106 may include one or more mid-level caches, such as level 2 (L2) cache, a level 3 (L3) cache, a level 4 (L4) cache, other levels of cache, a last level cache (LLC), and/or combinations thereof. In one embodiment, a ring based interconnect unit 1112 may be used to interconnect the special purpose logic 1108 (which may include integrated graphics logic), the set of shared cache units 1106, and the system agent unit 1110/integrated memory controller unit(s) 1114. In other embodiments, any number of other suitable techniques may be used for interconnecting such units. In one embodiment, coherency may be maintained between one or more cache units 1106 and cores 1102A-1102N.

In some embodiments, one or more of the cores 1102A-1102N may be capable of multithreading. In some embodiments, the system agent 1110 may include circuitry or logic for coordinating and operating cores 1102A-1102N. For example, the system agent unit 1110 may include a power control unit (PCU) and a display unit. The PCU may be or include logic and circuitry for regulating the power state of the cores 1102A-1102N and the special purpose logic 1108 (which may include integrated graphics logic). The display unit may include circuitry or logic for driving one or more externally connected displays.

In various embodiments, the cores 1102A-1102N may be homogenous or heterogeneous in terms of architecture instruction set. That is, two or more of the cores 1102A-1102N may be capable of executing the same instruction set, while others may be capable of executing only a subset of that instruction set or may execute a different instruction set.

Example Computer Architectures

Figure 12:
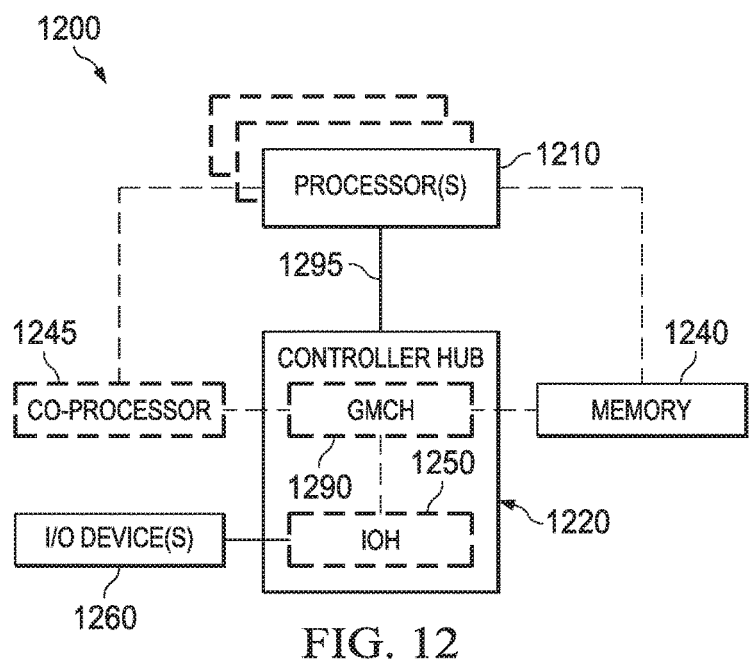
FIGS. 12 through 15 are block diagrams illustrating example computer architectures, according to some embodiments of the present disclosure.
Figure 13:
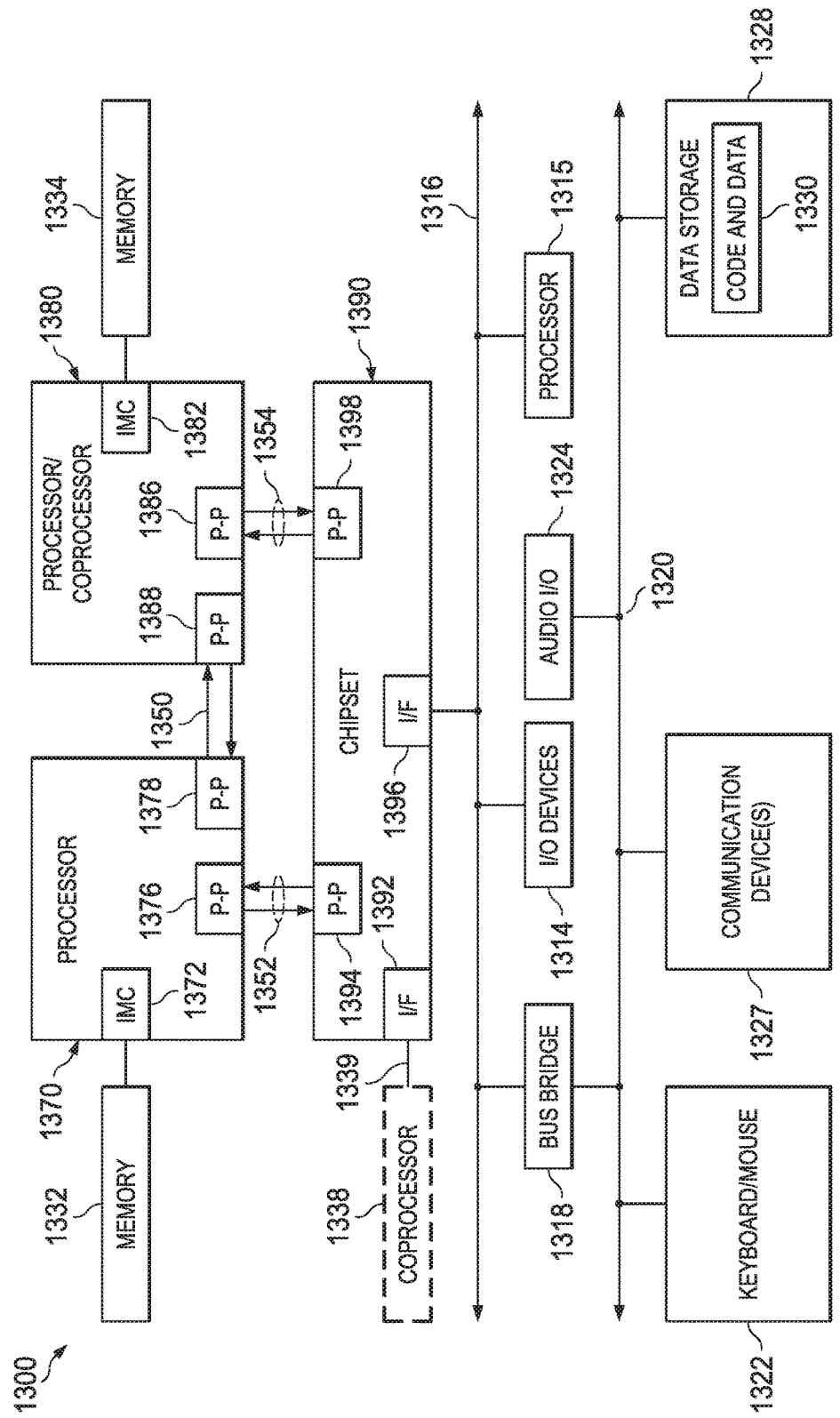
Figure 14:
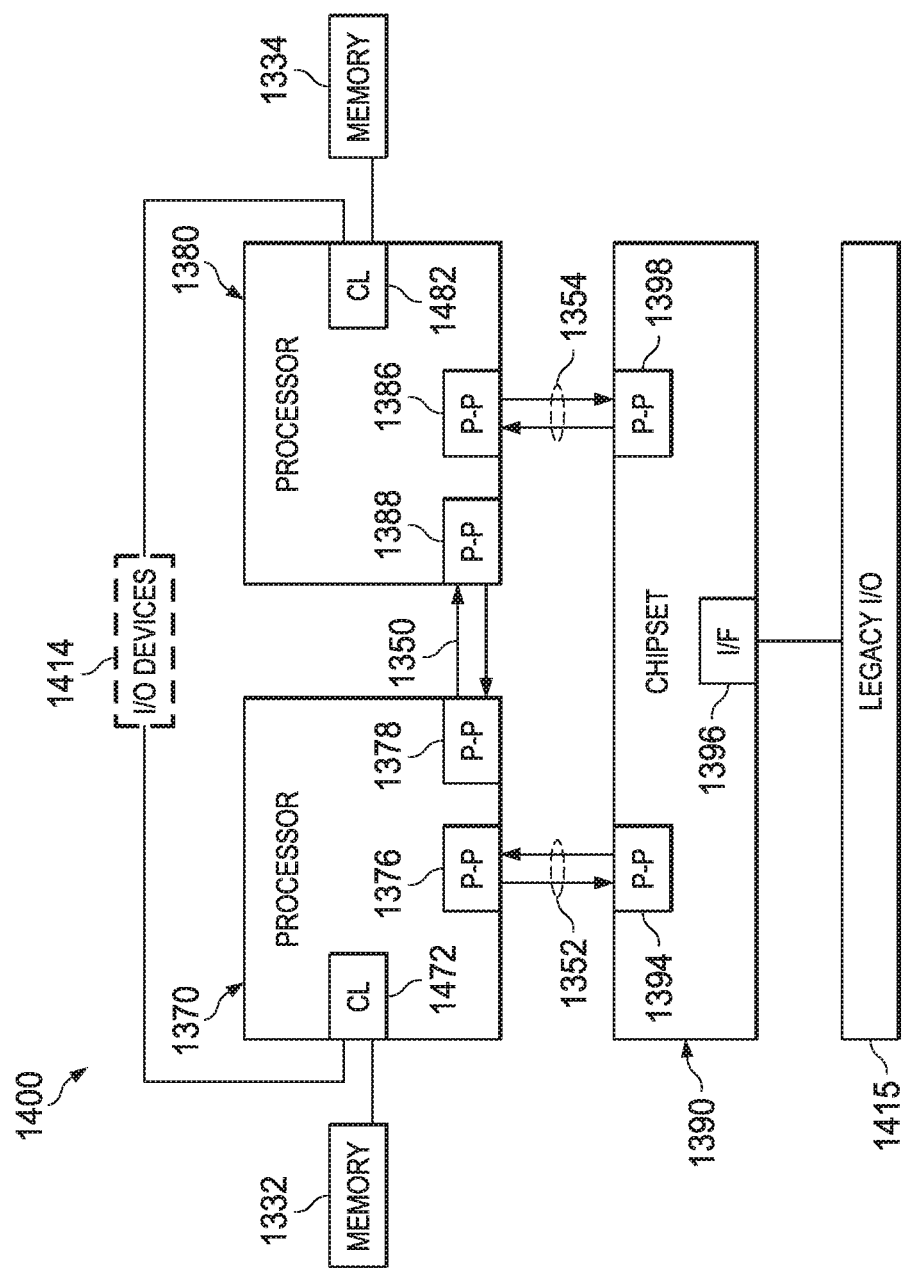
Figure 15:
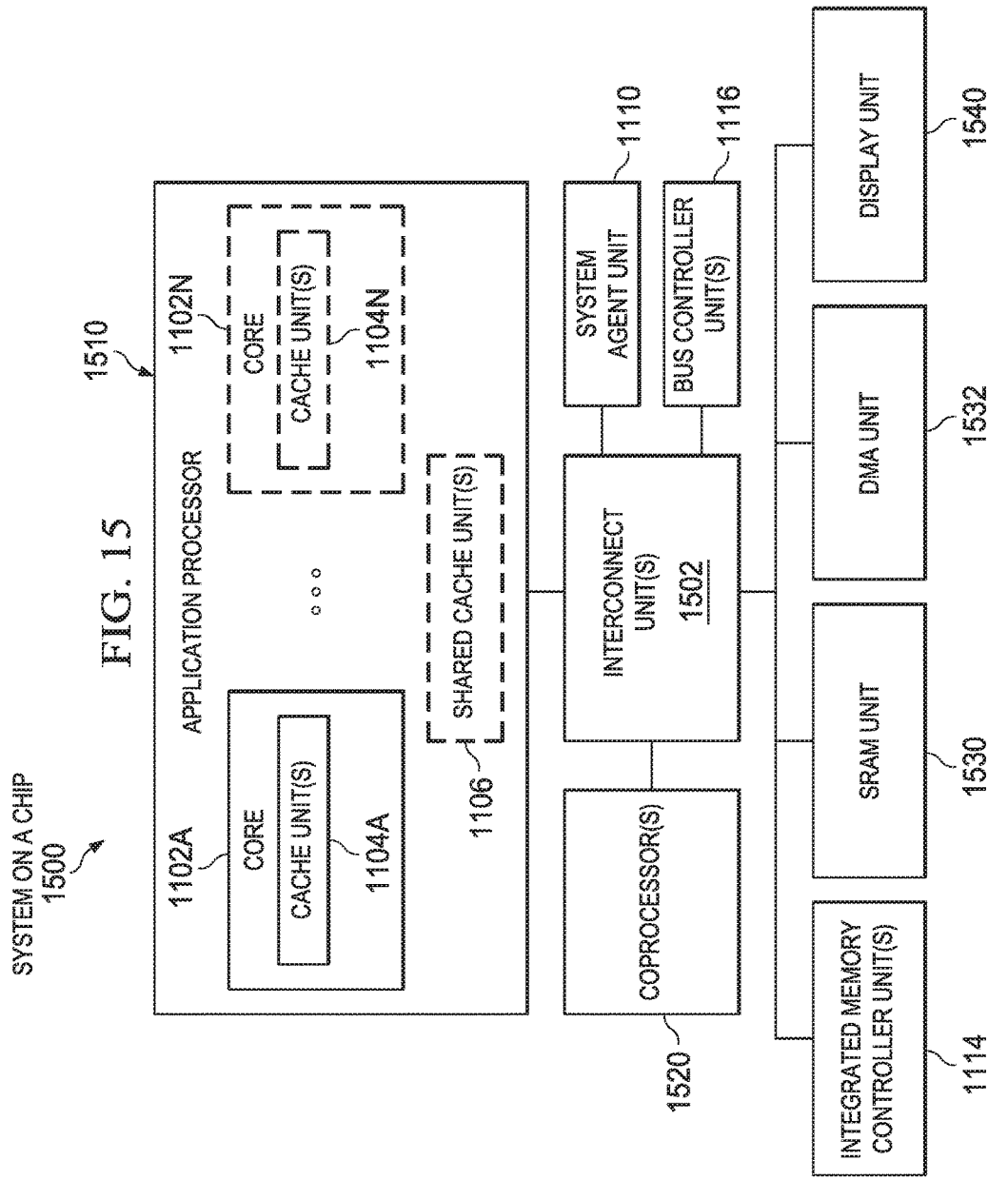

FIGS. 12 through 14 are block diagrams illustrating example systems suitable for the inclusion of one or more processors including, but not limited to, the processors described herein. FIG. 15 illustrates an example system on a chip (SoC) that may include one or more processor cores including, but not limited to, the processor cores described herein. Other system designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable for inclusion of the processors and/or processor cores described herein. In general, a huge variety of systems or electronic devices capable of incorporating a processor and/or other execution logic as disclosed herein are generally suitable for inclusion of the processors and/or processor cores described herein.

FIG. 12 is a block diagram illustrating a system 1200, in accordance with one embodiment of the present disclosure. As illustrated in this example, system 1200 may include one or more processors 1210, which are coupled to a controller hub 1220. In some embodiments, controller hub 1220 may include a graphics memory controller hub (GMCH) 1290 and an Input/Output Hub (IOH) 1250. In some embodiments, GMCH 1290 and IOH 1250 may be on separate chips. In this example, GMCH 1290 may include memory and graphics controllers (not shown) to which are coupled memory 1240 and a coprocessor 1245, respectively. In this example, IOH 1250 couples one or more input/output (I/O) devices 1260 to GMCH 1290. In various embodiments, one or both of the memory and graphics controllers may be integrated within the processor (as described herein), the memory 1240 and/or the coprocessor 1245 may be coupled directly to the processor(s) 1210, or the controller hub 1220 may be implemented in a single chip that includes the IOH 1250.

The optional nature of additional processors 1210 is denoted in FIG. 12 with broken lines. Each processor 1210 may include one or more of the processing cores described herein and may be implemented by a version of the processor 1100 illustrated in FIG. 11 and described herein.

In various embodiments, the memory 1240 may, for example, be dynamic random access memory (DRAM), phase change memory (PCM), or a combination of the two. In at least some embodiments, the controller hub 1220 may communicate with the processor(s) 1210 via a multi-drop bus such as a frontside bus (FSB), a point-to-point interface such as QuickPath Interconnect (QPI), or a similar connection, any one of which may be represented in FIG. 12 as interface 1295.

In one embodiment, the coprocessor 1245 may be a special purpose processor, such as, for example, a high-throughput MIC processor, a network or communication processor, a compression engine, a graphics processor, a GPGPU, an embedded processor, or another type of coprocessor. In one embodiment, controller hub 1220 may include an integrated graphics accelerator (not shown).

In some embodiments, there may be a variety of differences between the physical resources of different ones of the processors 1210. For example, there may be differences between the physical resources of the processors in terms of a spectrum of metrics of merit including architectural characteristics, micro-architectural characteristics, thermal characteristics, power consumption characteristics, and/or other performance-related characteristics.

In one embodiment, a processor 1210 may execute instructions that control data processing operations of a general type. Embedded within the instructions may be coprocessor instructions. The processor 1210 may recognize these coprocessor instructions as being of a type that should be executed by the attached coprocessor 1245. Accordingly, the processor 1210 may issue these coprocessor instructions (or control signals representing coprocessor instructions), on a coprocessor bus or other interconnect, to coprocessor 1245. Coprocessor(s) 1245 may accept and execute the received coprocessor instructions.

FIG. 13 is a block diagram illustrating a first example system 1300, in accordance with one embodiment of the present disclosure. As shown in FIG. 13, multiprocessor system 1300 implements a point-to-point interconnect system. For example, system 1300 includes a first processor 1370 and a second processor 1380 coupled to each other via a point-to-point interconnect 1350. In some embodiments, each of processors 1370 and 1380 may be a version of the processor 1100 illustrated in FIG. 11. In one embodiment, processors 1370 and 1380 may be implemented by respective processors 1210, while coprocessor 1338 may be implemented by a coprocessor 1245. In another embodiment, processors 1370 and 1380 may be implemented by a processor 1210 and a coprocessor 1245, respectively.

Processors 1370 and 1380 are shown including integrated memory controller (IMC) units 1372 and 1382, respectively. Processor 1370 also includes, as part of its bus controller units, point-to-point (P-P) interfaces 1376 and 1378. Similarly, processor 1380 includes P-P interfaces 1386 and 1388. Processors 1370 and 1380 may exchange information via a point-to-point (P-P) interface 1350 using P-P interface circuits 1378 and 1388. As shown in FIG. 13, IMCs 1372 and 1382 couple the processors to respective memories, shown as memory 1332 and memory 1334, which may be portions of a main memory that are locally attached to the respective processors.

Processors 1370 and 1380 may each exchange information with a chipset 1390 via individual P-P interfaces 1352 and 1354 respectively, using point to point interface circuits 1376, 1394, 1386, and 1398. Chipset 1390 may optionally exchange information with the coprocessor 1338 via interface 1392 over a high-performance interface 1339. In one embodiment, the coprocessor 1338 may be a special purpose processor, such as, for example, a high-throughput MIC processor, a network or communication processor, a compression engine, a graphics processor, a GPGPU, an embedded processor, or another type of special purpose processor. In one embodiment, coprocessor 1338 may include a high-performance graphics circuit and interface 1339 may be a high-performance graphics bus.

A shared cache (not shown) may be included in either processor or outside of both processors, yet may be connected with the processors via a P-P interconnect, such that either or both processors' local cache information may be stored in the shared cache if a processor is placed into a low power mode.

Chipset 1390 may be coupled to a first bus 1316 via an interface 1396. In various embodiments, first bus 1316 may be a Peripheral Component Interconnect (PCI) bus, a PCI Express bus, or another third generation I/O interconnect bus, although the scope of the present disclosure is not limited to these specific bus types.

As shown in FIG. 13, various I/O devices 1314 may be coupled to first bus 1316, along with a bus bridge 1318. Bus bridge 1318 may couple first bus 1316 to a second bus 1320. In one embodiment, one or more additional processor(s) 1315, such as one or more coprocessors, high-throughput MIC processors, GPGPU's, accelerators (e.g., graphics accelerators or digital signal processing (DSP) units), field programmable gate arrays, and/or any other processors, may be coupled to first bus 1316. In one embodiment, second bus 1320 may be a low pin count (LPC) bus. Various devices may be coupled to second bus 1320 including, for example, a keyboard and/or mouse 1322, one or more communication devices 1327 and a data storage unit 1328. Data storage unit 1328 may be a disk drive or another mass storage device, which may include instructions/code and data 1330, in one embodiment. In some embodiments, an audio I/O device 1324 may be coupled to the second bus 1320. Note that other architectures are possible. For example, instead of the point-to-point architecture illustrated in FIG. 13, a system may implement a multi-drop bus or another type of interconnect architecture.

FIG. 14 is a block diagram illustrating a second example system 1400, in accordance with one embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370 and 1380 may include integrated memory and I/O control logic ("CL") units 1472 and 1482, respectively. Thus, CL 1472 and CL 1482 may include integrated memory controller units and may also include I/O control logic. FIG. 14 illustrates that not only are the memories 1332 and 1334 coupled to CL 1472 and CL 1482, respectively, but I/O devices 1414 are also coupled to CL 1472 and CL 1482. In this example system, legacy I/O devices 1415 may also be coupled to the chipset 1390 via an interface 1396.

FIG. 15 is a block diagram illustrating a system on a chip (SoC) 1500, in accordance with one embodiment of the present disclosure. Similar elements in FIGS. 15 and 11 bear like reference numerals. Also, dashed lined boxes represent optional features on more advanced SoCs. In FIG. 15, one or more interconnect unit(s) 1502 are coupled to an application processor 1510, which includes a set of one or more cores 1102A-1102N, including respective local cache units 1104A-1104N, and shared cache unit(s) 1106. The interconnect unit(s) 1502 are also coupled to a system agent unit 1110, one or more bus controller unit(s) 1116, one or more integrated memory controller unit(s) 1114, a set of one or more coprocessors 1520, a static random access memory (SRAM) unit 1530, a direct memory access (DMA) unit 1532, and a display unit 1540 for coupling to one or more external displays. In one embodiment, the coprocessor(s) 1520 may include a special purpose processor, such as, for example, a network or communication processor, a compression engine, a GPGPU, a high-throughput MIC processor, an embedded processor, or another type of coprocessor. In another embodiment, the coprocessor(s) 1520 may be a media processor that includes integrated graphics logic, an image processor, an audio processor, and/or a video processor.

In various embodiments, the mechanisms disclosed herein may be implemented in hardware, software, firmware, or a combination of such implementation approaches. Some embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and to generate output information. The output information may be applied to one or more output devices, in known fashion. For purposes of this disclosure, a processing system may include any system that includes a processor, such as, for example, a digital signal processor (DSP), a microcontroller, an application specific integrated circuit (ASIC), or a microprocessor.

In some embodiments, the program code may be implemented in a high level procedural or object oriented programming language to communicate with a processing system. The program code may also be implemented in assembly or machine language, in other embodiments. In fact, the mechanisms described herein are not limited in scope to any particular programming language. In general, the programming language may be a compiled language or an interpreted language.

One or more aspects of at least one embodiment may be implemented by representative instructions stored on a non-transitory, machine-readable medium which represents various logic within the processor, which when read by a machine causes the machine to fabricate logic to perform the techniques described herein. Such representations, sometimes referred to as "IP cores", may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable memories (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off the processor.

FIG. 16 is a block diagram illustrating the use of a compiler and a software instruction converter to convert binary instructions in a source instruction set to binary instructions in a target instruction set, according to some embodiments. In the illustrated embodiment, the instruction converter may be a software instruction converter, although in other embodiments the instruction converter may be implemented in software, firmware, hardware, or various combinations thereof. FIG. 16 illustrates that a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that may be operable to generate x86 binary code 1606 (e.g., object code) that may, with or without additional linkage processing, be executed on the processor with at least one x86 instruction set core 1616. Similarly, FIG. 16 illustrates that the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1612 may be used to convert x86 binary code 1606 into code that may be natively executed by the processor without an x86 instruction set core 1614. This converted code might not be the same as the alternative instruction set binary code 1610; however, the converted code will accomplish the general operation and be made up of instructions from the alternative instruction set. Thus, instruction converter 1612 represents software, firmware, hardware, or a combination thereof that, through emulation, simulation or any other process, allows a processor or other electronic device that does not have an x86 instruction set processor or core to execute x86 binary code 1606.

Thus, techniques for performing one or more instructions according to at least one embodiment are disclosed. While certain example embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Embodiments of the present disclosure may include a processor. The processor may include a mirror address range register to store data indicating a location and a size of a first portion of a system memory to be mirrored, and a memory controller coupled to the mirror address range register and including circuitry to cause a second portion of the system memory to mirror the first portion of the system memory. In combination with any of the above embodiments, the memory controller may further include circuitry to cause a write request addressed to the second portion of memory to be disregarded when the second portion is mirroring the first portion. In combination with any of the above embodiments, the mirror address range register may include a base address register portion to store an address of a start of the first portion, and an end address register portion to specify a size of the first portion. In combination with any of the above embodiments, the memory controller is further to write status information indicating the status of a memory mirror to a status field portion of the end address register. In combination with any of the above embodiments, a plurality of least significant bits of the base address register may be hardwired to a fixed value, and the memory controller may be further configured to determine a minimum granularity of a mirroring range based on a determination of the number of the plurality of least significant bits that are hardwired to the fixed value. In combination with any of the above embodiments, the memory controller may further include circuitry to mirror the first portion in response to detecting a retirement of a write operation to the mirror address range register. In combination with any of the above embodiments, the memory controller is further to quiesce traffic to the second portion before beginning a mirror of the first portion.

Embodiments of the present disclosure may include a system. The system may include a system memory, and a processor, the processor including a mirror address range register to store data indicating a location and a size of a first portion of the system memory to be mirrored, and a memory controller coupled to the mirror address range register and including circuitry to cause a second portion of the system memory to mirror the first portion of the system memory. In combination with any of the above embodiments, the memory controller may further include circuitry to cause a write request addressed to the second portion of memory to disregarded when the second portion is mirroring the first portion. In combination with any of the above embodiments, the wherein the mirror address range register may include a base address register portion to store an address of a start of the first portion, and an end address register to store an address of an end of the first portion. In combination with any of the above embodiments, the memory controller may further include circuitry to write status information indicating the status of a memory mirror to a status field portion of the end address register. In combination with any of the above embodiments, a plurality of least significant bits of the base address register may be hardwired to a fixed value, and the memory controller may be further configured to determine a minimum granularity of a mirroring range based on a determination of the number of the plurality of least significant bits that are hardwired to the fixed value. In combination with any of the above embodiments, the memory controller may further include circuitry to mirror the first portion in response to detecting a retirement of a write operation to the mirror address range register. In combination with any of the above embodiments, the memory controller may further include circuitry to quiesce traffic to the second portion before beginning a mirror of the first portion.

Embodiments of the present disclosure may include a method. The method may include identifying a memory associated with a memory controller, requesting a first portion of the memory to be mirrored, vacating a second portion of the memory to be used as a mirroring portion, and mirror the first portion of the memory with the second portion of the memory. In combination with any of the above embodiments, requesting a first portion of the memory to be mirrored may include writing data representing a start address of the first portion to a mirror address base register, and writing data representing a size of the first portion to the mirror address range register. In combination with any of the above embodiments, vacating the second portion of the memory may include vacating the second portion of the memory based on detecting the writing of the end address to the mirror address range register. In combination with any of the above embodiments, the mirroring the first portion of the memory with the second portion of the memory may include directing any write request to the first portion of the memory to the first portion of the memory and to the second portion of the memory. In combination with any of the above embodiments, the mirroring the first portion of the memory with the second portion of the memory may include disregarding a write request addressed to the second portion of memory. In combination with any of the above embodiments, the method may further include receiving a notification that mirroring is operational. In combination with any of the above embodiments, the method may further include validating the data representing the start address of the first portion and the data representing the size of the first portion, calculating system address decoder values, and determining a location for the second portion. In combination with any of the above embodiments, the validating the data representing the start address of the first portion and the data representing the size of the first portion may further include determining a minimum mirroring granularity by writing test data to the mirror address base register, reading data from the mirror address base register, and comparing the written test data to the data read from the mirror address base register.

Embodiments of the present disclosure may include an apparatus. The apparatus may include a system memory means, a processor means, the processor means including a mirror address range means to store data indicating a location and a size of a first portion of the system memory means to be mirrored and a memory controller means coupled to the mirror address range means and including means to cause a second portion of the system memory means to mirror the first portion of the system memory means. In combination with any of the above embodiments, the memory controller means may further include means to cause a write request addressed to the second portion of memory means to be disregarded when the second portion is mirroring the first portion. In combination with any of the above embodiments, the mirror address range means may include a base address means to store an address of a start of the first portion, and an end address means to store an address of an end of the first portion. In combination with any of the above embodiments, the memory controller means further includes means to write status information indicating the status of a memory mirror means to a status field portion of the end address means. In combination with any of the above embodiments, a plurality of least significant bits of the base address means may be hardwired to a fixed value, and the memory controller means may be further configured to determine a minimum granularity of a mirroring range based on a determination of the number of the plurality of least significant bits that are hardwired to the fixed value. In combination with any of the above embodiments, the memory controller means may further include means to mirror the first portion in response to detecting a retirement of a write operation to the mirror address range means. In combination with any of the above embodiments, the memory controller means may further include means to quiesce traffic to the second portion before beginning a mirror of the first portion.

What is claimed is:

1. A processor, comprising:
   a mirror address range register to store data indicating a location and a size of a first portion of a system memory to be mirrored, the mirror address range register comprising:
     a base address register portion to store an address of a start of the first portion, the base address register portion to include a plurality of least significant bits containing a fixed value; and
     an end address register portion to indicate a size of the first portion; and
   a memory controller coupled to the mirror address range register and including a mirror circuit to:
     determine a minimum granularity of a mirroring range based on determining a number of the plurality of least significant bits containing the fixed value; and
     cause a second portion of the system memory to mirror the first portion of the system memory.

2. The processor of claim 1, wherein the memory controller is further to cause a write request addressed to the second portion of memory to be disregarded when the second portion is mirroring the first portion.

3. The processor of claim 1, wherein the end address register portion is to specify a size of the first portion.

4. The processor of claim 3, wherein the memory controller is further to write status information indicating the status of a memory mirror to a status field portion of the end address register.

5. The processor of claim 1, wherein:
   the plurality of least significant bits of the base address register portion are hardwired to the fixed value.

6. The processor of claim 1, wherein the memory controller is further to mirror the first portion in response to detecting a retirement of a write operation to the mirror address range register.

7. The processor of claim 1, wherein the memory controller is further to quiesce traffic to the second portion before beginning a mirror of the first portion.

8. The processor of claim 1, wherein the end address register portion is to specify an end address of the first portion.

9. A system, comprising:
   a system memory; and
   a processor, the processor including:
     a mirror circuit, including a mirror address range register to store data indicating a location of a first portion of the system memory to be mirrored, the mirror address range register comprising:
       a base address register portion to store an address of a start of the first portion, the base address register to include a plurality of least significant bits containing a fixed value; and
       an end address register portion to indicate an end of the first portion; and a memory controller coupled to the mirror address range register and including circuitry to:
  determine a minimum granularity of a mirroring range based on determining a number of the plurality of least significant bits containing the fixed value; and
  cause a second portion of the system memory to mirror the first portion of the system memory.

10. The system of claim 9, wherein the memory controller is further to cause a write request addressed to the second portion of memory to be disregarded when the second portion is mirroring the first portion.

11. The system of claim 9, wherein the end address register is to store an address of the end of the first portion.

12. The system of claim 11, wherein the memory controller is further to write status information indicating the status of a memory mirror to a status field portion of the end address register.

13. The system of claim 9, wherein:
  the plurality of least significant bits of the base address register portion are hardwired to the fixed value.

14. The system of claim 9, wherein the memory controller is further to mirror the first portion in response to detecting a retirement of a write operation to the mirror address range register.

15. The system of claim 9, wherein the memory controller is further to quiesce traffic to the second portion before beginning a mirror of the first portion.

16. A method, comprising:
  identifying a memory associated with a memory controller circuit;
  determining, by the memory controller circuit, a minimum granularity of a mirroring range based on determining a number of a plurality of least significant bits containing a fixed value in a base address register;
  requesting a first portion of the memory to be mirrored, the requesting including:
    writing data representing a start address of the first portion to the base address register; and
    writing data representing a size of the first portion to an end address register;
  vacating a second portion of the memory to be used as a mirroring portion; and
  mirroring the first portion of the memory with the second portion of the memory.

17. The method of claim 16, wherein vacating the second portion of the memory includes vacating the second portion of the memory based on detecting the writing of an end address of the first portion to the base address register.

18. The method of claim 16, wherein mirroring the first portion of the memory with the second portion of the memory includes directing any write request to the first portion of the memory to the first portion of the memory and to the second portion of the memory.

19. The method of claim 16, wherein mirroring the first portion of the memory with the second portion of the memory includes disregarding a write request addressed to the second portion of memory.

20. The method of claim 16, further comprising receiving a notification that mirroring is operational.

* * * * *